(12) United States Patent
Tsu

(10) Patent No.: US 6,768,666 B2
(45) Date of Patent: Jul. 27, 2004

(54) PHASE ANGLE CONTROLLED STATIONARY ELEMENTS FOR WAVEFRONT ENGINEERING OF ELECTROMAGNETIC RADIATION

(75) Inventor: David Tsu, Auburn Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/226,828

(22) Filed: Aug. 23, 2002

(65) Prior Publication Data

US 2004/0036944 A1 Feb. 26, 2004

(51) Int. Cl.$^7$ .............................. G11C 13/00; G02F 1/01
(52) U.S. Cl. ....................... 365/113; 365/114; 365/163; 369/13.35; 369/284; 369/288; 257/2; 359/279
(58) Field of Search ......................... 365/112–114, 163; 369/13.35, 284, 288; 257/2; 359/240, 243, 279, 290, 299, 321

(56) References Cited

U.S. PATENT DOCUMENTS

| | | | | |
|---|---|---|---|---|
| 4,653,024 A | * | 3/1987 | Young et al. ................ | 365/113 |
| 4,710,899 A | * | 12/1987 | Young et al. ................ | 365/113 |
| 4,820,394 A | * | 4/1989 | Young et al. .......... | 204/192.26 |
| 5,128,099 A | * | 7/1992 | Strand et al. ................ | 420/579 |
| 5,536,947 A | * | 7/1996 | Klersy et al. .................... | 257/3 |
| 5,687,112 A | * | 11/1997 | Ovshinsky .................. | 365/163 |
| 5,825,046 A | * | 10/1998 | Czubatyj et al. ................ | 257/2 |
| 5,912,104 A | * | 6/1999 | Hirotsune et al. ...... | 430/270.13 |
| 5,912,839 A | * | 6/1999 | Ovshinsky et al. .... | 365/185.03 |
| 5,935,672 A | * | 8/1999 | Zhou et al. ................. | 428/64.1 |
| 6,011,757 A | * | 1/2000 | Ovshinsky ............... | 369/13.35 |
| 6,141,241 A | * | 10/2000 | Ovshinsky et al. ......... | 365/163 |

* cited by examiner

Primary Examiner—Evelyn A. Lester
(74) Attorney, Agent, or Firm—Kevin L. Bray; Marvin S. Siskind

(57) ABSTRACT

A reconfigurable and stationary element for the engineering of the wavefront of electromagnetic radiation. The element includes a phase change material that may be reversibly transformed between its crystalline and amorphous states. By forming a gradient in crystallinity, a phase taper may be stored in the phase change material of the instant element. The phase taper provides control of the phase angle of reflected or reradiated electromagnetic radiation. An incident wavefront of electromagnetic radiation interacts with the instant element and is reradiated with controlled propagation characteristics imposed by the stored phase taper. The instant element may provide non-specular reflection, beam steering, focusing, defocusing, symmetrical and asymmetrical cross section effects, and wavefront correction. In a preferred embodiment, a pattern of amorphous marks is formed within a crystalline matrix of phase change material. By controlling the size, shape, spacing, symmetry and distribution of marks, crystallinity gradients of various strengths in one or more directions may be formed to provide phase tapers that effect the engineering of wavefronts. An apparatus for forming patterns of marks included in the instant element is also provided.

53 Claims, 10 Drawing Sheets

PHASE ANGLE CONTROLLED STATIONARY ELEMENTS FOR WAVEFRONT ENGINEERING OF ELECTROMAGNETIC RADIATION

FIELD OF THE INVENTION

This invention relates to devices for controlling the wavefront of electromagnetic radiation. More particularly, this invention relates to stationary elements that provide control of the direction of propagation, the degree of focusing, distortions and other wavefront characteristics of electromagnetic radiation. Most particularly, this invention relates to stationary elements with programmable and reconfigurable phase angle control of electromagnetic radiation.

BACKGROUND OF THE INVENTION

The ability to route, redirect and control the flow of electromagnetic radiation is important in a number of technological applications. Optical information systems, for example, are expected to become increasingly important as the demand for high speed and high density transmission and storage of data escalates. In order to optimize the functionality of optical devices, it is necessary to exercise precise control over the direction of propagation of light. Reading and writing of optical data, for example, typically requires precise positioning of one or more optical beams at well-defined locations within an optical recording medium. In many applications, it is also desirable to exact control over the propagation of light with increasingly compact devices. Miniaturization and enhanced functionality of optical components are essential for future technologies. Similar capabilities are desired for electromagnetic frequencies outside the optical range.

Traditional devices for controlling the propagation of electromagnetic radiation include reflecting elements such as mirrors and beam splitters, focusing elements such as lenses and parabolic mirrors, and dispersive elements such as prisms. These devices, of course, have proven to be remarkably reliable and effective at directing light in intended ways, but suffer from the drawback that once fabricated and positioned, their ability to control the propagation of electromagnetic radiation is fixed. Any change in propagation requires a physical movement of the device and may involve cumbersome and/or slow alignment procedures.

Efforts at miniaturizing devices for controlling the propagation of electromagnetic radiation have recently focused on MEMS (micro-electro-mechanical systems) technology. MEMS components are small, lightweight and capable of routing electromagnetic radiation in miniature device packages. MEMS technology includes miniature mirrors configured in arrays that may contain several hundred mirrors that are precisely positioned and/or tilted relative to each other. MEMS is a potentially advantageous technology because the component masses are very low and thus require little force for the repositioning necessary to achieve a dynamic performance capability. Electrostatic actuation, for example, may be used to reposition MEMS components for the purpose of redirecting the propagation of electromagnetic radiation. Most efforts at developing MEMS technology have focused on optical switching and optical cross-connects. MEMS technology may be used, for example, to direct optical signals to specific fibers in a fiber bundle and to redirect a signal to other fibers upon repositioning. MEMS may also be used in combination with a deformable mirror to correct wavefront aberrations. In this application, the MEMS components are not reflective, but rather are used to provide precise motion of an overlying deformable reflective surface at localized points to provide compensation for aberrations present in an incident wavefront. Precise control of the positioning of electromagnetic radiation is in principle possible with MEMS technology.

Although MEMS technology offers several potential advantages, its' implementation presents several problems. First, although MEMS components are repositionable, the repositioning is through a mechanical process and occurs on a millisecond timescale. Faster dynamic capability is desirable for many applications. Second, MEMS systems are delicate and susceptible to disruptions caused by external disturbances such as vibrations. These disturbances alter the positioning of MEMS components and impair functionality. Complicated feedback systems may thus be needed to insure robustness of operation in typical application environments. Third, MEMS systems are currently very expensive. The high cost is associated with the intricacies of fabricating the miniature components, the large number of components typically required for an application, and the precise assembling of components, along with actuating means, into the three-dimensional arrays required for many applications.

Accordingly, improved devices for controlling the propagation of electromagnetic radiation are needed in the art. Ideally, these devices should be stationary, dynamically reconfigurable, and provide for the reflection, redirection, focusing, and defocusing of electromagnetic radiation as well as the correction of wavefront aberrations.

SUMMARY OF THE INVENTION

The instant invention provides devices for controlling the propagation of electromagnetic radiation. The devices are stationary elements designed to reflect electromagnetic radiation in controlled directions, focus or defocus electromagnetic radiation, and correct wavefront aberrations of electromagnetic radiation. The operation of the instant elements is based on precise control of the phase angle of incident electromagnetic radiation. The incident electromagnetic radiation interacts with the instant elements and is controllably reradiated according to the phase angle characteristics programmed into or stored in a phase change material included in the instant devices. Controlled reradiation includes the redirection, reflection, focusing, defocusing or correcting of the incident electromagnetic radiation. These effects may be achieved through proper spatial control of the phase angle of the reradiated electromagnetic radiation.

The phase change material of the instant devices has an amorphous state and a crystalline state. Due to differences in the chemical bonding while in these two states, their response to optical stimulation, as quantified by the so-called optical constants (n, k), differ significantly. The amorphous and crystalline states may be present simultaneously in a volume of phase change material where the spatial distribution and relative proportion of one state relative to the other may be used to tune the optical response so as to provide, for example, phase angle control of reradiated electromagnetic radiation. In a preferred embodiment, a volume of phase change material is divided up into a plurality of data cells having uniform size of dimensions smaller than the wavelength of incident electromagnetic radiation where each data cell includes an amorphous mark within a crystalline matrix. Phase angle control may be achieved through properly designing and forming a pattern of amorphous marks within the plurality of data cells.

The phase change material of the instant devices may be reversibly transformed between its amorphous and crystalline states through the providing of energy, preferably in the form of optical energy. The reversibility permits the reconfiguration of a pattern of marks to provide devices with tunable functionality. Reconfiguration includes altering the shape of one or more marks and/or the spatial distribution of marks within the volume of phase change material. Tunability of functionality may include changing the propagation direction of reradiated electromagnetic radiation, changing the degree of focusing or defocusing, or the nature of wavefront correction. Reconfiguration of the pattern of marks may occur on a fast time scale thereby providing a rapid dynamic tuning of the functionality of the instant devices.

In one embodiment, a tapered pattern of marks is formed in a phase change material to provide a device capable of reflecting electromagnetic radiation in a controlled direction.

In another embodiment, a symmetrically disposed pattern of marks is formed in a phase change material to provide a device capable of focusing or defocusing electromagnetic radiation.

In yet another embodiment, wavefront correction is achieved by tailoring a pattern of marks to compensate for aberrations.

Other devices including one or more additional layers in combination with a phase angle controlling layer of phase change material are also disclosed. These additional layers may include dielectric layers, metal layers or substrates.

Also disclosed are devices that include a phase angle controlling layer of phase change material and means for forming and reconfiguring marks.

DETAILED DESCRIPTION

The instant invention provides devices for controlling the propagation of electromagnetic radiation. The devices are stationary elements designed to reflect electromagnetic radiation in controlled directions, focus or defocus electromagnetic radiation, and correct wavefront aberrations of electromagnetic radiation. Control of the propagation of electromagnetic radiation through the instant stationary elements is achieved through control of the phase angle of electromagnetic radiation emanating from the elements. The emanating electromagnetic radiation is produced upon interaction of incident electromagnetic radiation with the instant elements. The incident electromagnetic radiation is absorbed or otherwise retained by the instant elements, acted on according to the principles of the instant invention as described hereinbelow, and subsequently re-emitted by the instant elements in a controlled direction, with a controlled level of focusing and/or in a corrected form. The re-emitted electromagnetic radiation may also hereinafter be referred to as reradiated radiation, emanating radiation or the like.

The primary effect exerted by the instant elements is local spatial control of the phase angle of the reradiated electromagnetic radiation. The instant elements may receive incident electromagnetic radiation that propagates at an arbitrary angle of incidence and convert it to reradiated electromagnetic radiation having controlled propagation, focusing and/or wavefront properties that are determined primarily by the configuration of a phase change material contained within the instant elements. As described more fully hereinbelow, the structural state of a phase change material may be configured to provide control of the phase angle of radiation emanating from the instant elements. Thus, a particular configuration of the phase change material of the instant elements may emanate electromagnetic radiation having particular characteristics (e.g. direction of propagation, degree of focusing, wavefront properties) regardless of the input direction of the incident radiation.

Figure 1:
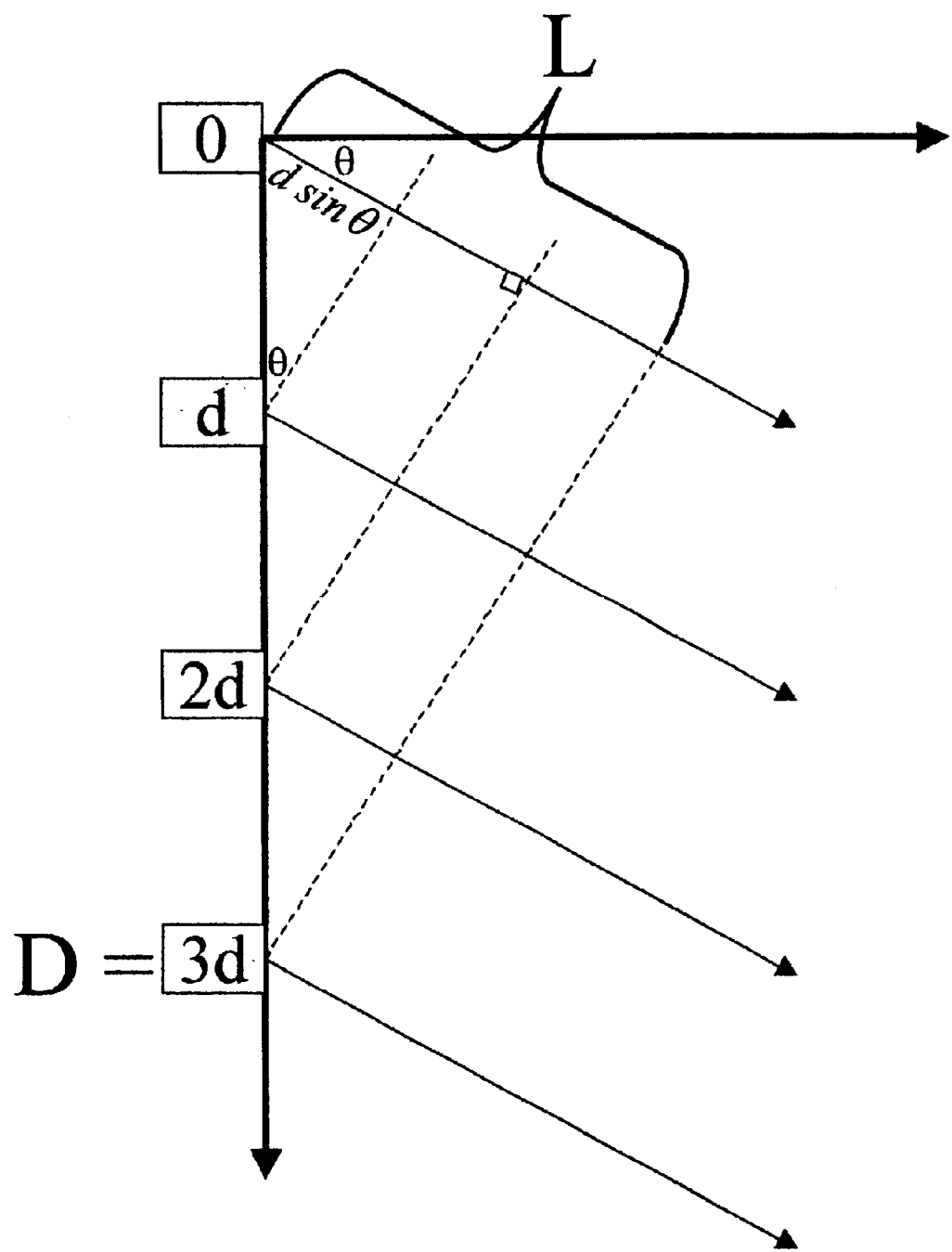
FIG. 1. Reflection of electromagnetic radiation from scattering centers.

The importance of phase angle in controlling the propagation of electromagnetic radiation may be illustrated using the example of reflection from a mirror. In FIG. 1 is shown a schematic depiction of reflection from a vertically oriented surface 10 having a surface normal 11. The surface includes scattering centers 12 spaced a distance d apart. Four scattering centers located at positions 0, d, 2d and 3d are included in FIG. 1. The solid arrows 13 depict the direction of propagation of reradiated electromagnetic radiation emanating from the surface. The angle of reflection $\theta$ may be used to describe this direction of propagation. The dashed lines 14 indicate the development of the wavefront of the reradiated electromagnetic radiation as contributions from an increasing number of scattering centers are included. The wavefront of the incident electromagnetic radiation has been omitted, but is easily envisioned since the angle of incidence equals the angle of reflection in specular reflection.

The magnitude of the distance d relative to the wavelength $\lambda$ of incident electromagnetic radiation influences the nature of the re-emitted radiation from the surface. If $d > \lambda$, the surface acts like a diffraction grating and the re-emitted radiation includes electromagnetic radiation at the specular angle (m=0) as well as all (+) and (−) diffraction orders (±1, ±2, . . . ).

In mirrors, specular reflection occurs because the scattering centers are spaced closer than the wavelength λ of incident electromagnetic radiation and all incident electromagnetic radiation is reradiated to produce reflected electromagnetic radiation at the wavelength λ. In specular reflection, the angle of incidence of the incident radiation is equal to the angle of reflection of the reflected radiation. Two conditions must be satisfied in order to achieve specular radiation. First, the spacing d between scattering centers must be less than the wavelength of incident radiation. In an actual mirror, the scattering centers are infinitesimally close together. Second, the relative difference in the phase angle of reradiated light emitted from adjacent scattering centers must be constant. According to the latter constant differential condition, for example, the differential or shift in phase angle between radiation emitted from the scattering center at 0 and the scattering center at d is the same as the differential or shift in phase angle between radiation emitted from the scattering center at d and the scattering center at 2d etc. The magnitude of the constant differential or shift in phase angle between adjacent scattering centers, in turn, dictates the angle of reflection of the re-emitted radiation. The differential or shift in phase angle between adjacent scattering centers may also be referred to herein as the phase shift between adjacent scattering centers. The sequence of phase angles associated with a series of scattering centers shall hereinafter be referred to as the phase taper. In the situation of FIG. 1, for example, if the phase of emission reradiated from the scattering center at 0 is $\phi$, then the phase of emission reradiated from the scattering center at d is $\phi+\Delta\phi$ and the phase of the emission reradiated from the scattering center at 2d is $\phi+2\Delta\phi$, etc. where the phase shift is $\Delta\phi$ and the phase taper is $\phi$, $\phi+\Delta\phi$, $\phi+2\Delta\phi$, . . . .

In a standard mirror, the angle of incidence controls the phase taper along a series of scattering centers. As incident electromagnetic radiation encounters the surface of a mirror, it induces acceleration of electron charges in the material. These accelerated electron charges correspond to the scattering centers of the mirror. According to classical physics, acceleration of charge leads to emission of electromagnetic radiation. In the case of the mirror, the emitted electromagnetic radiation emanating from the scattering centers corresponds to the reflected electromagnetic radiation. The phase of reflected radiation emanating from different scattering centers correlates with the time at which the different centers reradiate. The constant phase shift (i.e. phase angle differential) condition required for specular reflection can be achieved if the differential time of initiation of reradiation from adjacent centers is constant. In the situation of FIG. 1, for example, a constant phase shift over the depicted scattering centers at positions 0, d, 2d and 3d can be achieved if the time delay in the initiation of reradiation is the same between the scattering center at 0 and the scattering center at d as it is between the scattering center at d and the scattering center at 2d etc. The time at which a particular scattering center reradiates is determined by the time at which the incident electromagnetic radiation interacts with the center. By insuring that the differential time of interaction of the incident electromagnetic radiation is a constant between adjacent scattering centers, it is possible to insure that the phase shift between adjacent scattering centers is constant. Specular reflection may thereby be achieved.

The angle of incidence of incident electromagnetic radiation determines the differential time of interaction between adjacent scattering centers. In the situation of FIG. 1, for example, the wavefront of the incident electromagnetic radiation (not shown) approaches from the side of the surface normal 11 opposite to that of the reflected wavefront 14. The incident wavefront first encounters the scattering center at 0, next encounters the scattering center at d, then encounters the scattering center at 2d, etc. Reradiation thus occurs from the scattering center at 0 before it occurs from the scattering center at d. The scattering center at d, in turn, reradiates before the scattering center at 2d etc. The time delay associated with reradiation from the different scattering centers, and thus the phase shift (i.e. differential phase angle), is directly related to the relative times at which the different centers encounter the incident wavefront. These relative times are determined by the path length traversed by the incident wavefront before encountering the different centers. In the example of FIG. 1, the incident light traverses the shortest path to interact with the scattering center at 0 so this scattering center reradiates first. The path length increases by an amount equal to $d\cos\theta$ for each successive scattering center. The incident wavefront, for example, must traverse a path to the scattering center at d that is $d\cos\theta$ longer than the path it traversed to the scattering center at 0. The path to the scattering center at 2d is longer by $2d\cos\theta$ etc. Since the path length difference is constant between adjacent scattering centers, the differential time of initiation of reradiation between adjacent centers is also constant. The phase shift is therefore constant and specular reflection occurs.

As mentioned hereinabove, the direction of specular reflection is determined by the magnitude of the constant phase shift between adjacent scattering centers. The smaller the phase shift, the smaller the angle of reflection $\theta$ indicated in FIG. 1 herein. A small phase shift correlates with a small path length difference between the incident wavefront and adjacent scattering centers. Thus, the angle of reflection decreases as the incident direction of propagation approaches the normal direction of the reflecting surface. In the limiting case of incident light propagating normal to a reflecting surface (i.e. wavefront parallel to the reflecting surface), the incident wavefront interacts with all scattering centers simultaneously. The phase shift is constant in this limiting case, but has a magnitude of zero since all scattering centers initiate reradiation at the same time. The reflected light therefore propagates normal to the reflecting surface ($\theta=0°$) in a direction opposite to that of the incident light. A non-zero angle of reflection requires a non-zero phase shift between adjacent scattering centers. The larger the phase shift, the larger the angle of reflection.

The discussion hereinabove shows that control of the direction of propagation of electromagnetic radiation amounts to control of the phase taper along a series of scattering centers. The phase taper has a phase shift, in turn, that is controlled by the differential in path length between adjacent scattering centers traversed by the incident wavefront. In a conventional reflective mirror, the differential in path length correlates with the angle of incidence. The larger the angle of incidence (as measured from the normal to the reflecting surface), the larger the differential in path length and therefore the larger the phase shift and the larger the angle of reflection. An analysis of path length differentials shows that the angle of incidence necessarily equals the angle of reflection.

In the conventional mirror described hereinabove, the incident light establishes the phase shift between adjacent scattering centers and hence controls the direction of propagation of the reflected light. Redirection of electromagnetic radiation requires changing the phase shift between adjacent scattering centers and can be accomplished by changing the angle of incidence of the incident light with respect to a fixed reflective surface or by tilting the reflective surface with respect to a fixed incident wavefront. In either scenario, physical motion of an element is required and this motion leads to the change in path length between the incident wavefront and adjacent scattering centers needed to effect the change in phase shift needed to redirect the incident electromagnetic radiation.

In the instant elements, the need for physical motion in order to redirect electromagnetic radiation is eliminated by using a phase change material to provide a phase taper along a series of scattering centers. In a conventional reflector, the phase taper is created upon interaction of the incident wavefront with the scattering centers of a reflecting surface. Once the incident electromagnetic radiation is removed, the impetus responsible for forming the phase taper is absent and the phase taper disappears. The phase taper induced by incident electromagnetic radiation in conventional reflection is non-persistent. If it were possible, however, to retain or store the phase taper induced by a particular incident wavefront, this stored phase taper would supplement or modify a phase taper induced by subsequent incident electromagnetic radiation having a different angle of incidence than the original electromagnetic radiation from which the stored taper was derived. Under these conditions, the angle of incidence and the angle of reflection would not be equal and the direction of propagation of reflected electromagnetic radiation would deviate from the specular direction. The extent of the deviation from the specular direction would be characteristic of the stored phase taper. In essence, a stored phase taper is persistent phase taper that provides a perturbation that causes a deviation of the direction of propagation from the specular direction.

In an ordinary reflection process, incident electromagnetic radiation encounters a reflecting surface having no stored phase taper and as a result, specular reflection always occurs with the angle of reflection equaling the angle of incidence. In the presence of a stored taper, deviations from the specular direction of reflection occur. One object of the instant invention is to provide elements for controlling the propagation and wavefront characteristics of electromagnetic radiation that include a stored phase taper. The instant elements include a phase change material having different structural states that may co-exist simultaneously. As described more fully hereinbelow, by varying the relative proportion and spatial distribution of different structural states within a given volume of phase change material, it is possible to store a persistent phase taper. As a result, the instant elements provide for non-specular control over the propagation of electromagnetic radiation. Effects achievable with the instant invention involve the general manipulation of the direction of propagation and wavefront characteristics of electromagnetic radiation and include non-specular reflection, focusing, defocusing, beam shaping and wavefront correction.

The phase change materials of the instant invention have a crystalline state and an amorphous state and may be reversibly transformed between these states through the providing of energy. Many properties and compositions of phase change materials are known in the art and have been discussed previously, for example, in U.S. Pat. Nos. 3,271,591; 3,530,441; 4,653,024; 4,710,899; 4,737,934; 4,820,394; 5,128,099; 5,166,758; 5,296,716; 5,534,711; 5,536,947; 5,596,522; 5,825,046; 5,687,112; 5,912,104; 5,912,839; 5,935,672; 6,011,757; and 6,141,241 to the instant assignee, as well as U.S. patent application Ser. No. 10/026,395 (U.S. Pat. Appl. Pub. No. US-2002-0114256-A1) and No. 60/316566 (provisional application) to the instant assignee, the disclosures of which are hereby incorporated by reference. A brief review of some of these properties and compositions as they pertain to the instant elements is presented in the following several paragraphs.

The application of energy to a phase change material induces transformations among its structural states. Phase change materials have characteristic melting and crystallization temperatures and the structural state may be influenced through the controlled application of energy vis-a-vis these temperatures. Application of energy sufficient to heat a phase change material above its melting temperature followed by rapid quenching promotes the formation of an amorphous phase. Slow quenching, on the other hand, may permit crystallization and the formation of crystalline regions within the phase change material to provide partially crystalline or crystalline materials. Application of energy in an amount sufficient to heat a phase change material to between its crystallization and melting temperatures may induce a partial or complete transformation of amorphous regions to a crystalline phase.

Whether or not crystalline regions form from amorphous regions and the extent to which they form depend on the amount of energy applied to the phase change material and/or the power (i.e. rate of addition of energy) applied. The amount of energy and/or power necessary to induce formation of crystalline regions or to modify existing crystalline regions in a phase change material through growth or depletion depends on factors such as the chemical composition of the phase change material, the initial state of the phase change material, and the kinetics and thermodynamics of crystal nucleation and growth processes. Amorphous regions may also be formed from crystalline regions. Formation of amorphous regions requires application of a sufficient amount of energy to induce a molten or other high mobility state and a sufficient rate of quenching to inhibit formation of a crystalline phase.

Energy may be applied to selected portions of a volume of phase change material to induce localized structural transformations without disturbing surrounding portions of the phase change material. Such localized structural transformations may also be used to alter the volume fraction of, for example, an amorphous phase within a surrounding crystalline phase. Phase stabilization and transformations among structural states are influenced by factors that include the kinetics and thermodynamics of crystallization processes, the distribution and flow (e.g. dissipation, diffusion, conduction) of energy within the phase change material as well as the intensity, duration and spatial distribution of applied energy. Localized structural transformations may also be used to control the size, shape or volume of one phase within a surrounding matrix of another phase. The shaping of amorphous phase regions (e.g. marks) within a crystalline matrix using a low thermal budget strategy, for example, has been previously described in U.S. patent application Ser. No. 10/026,395 (U.S. Pat. Appl. Pub. No. US-2002-0114256-A1) incorporated by reference hereinabove.

Transformations among structural states are effected upon the application of energy to a phase change material, or portions thereof, in appropriate amounts at appropriate rates. Energy in various forms may be used to effect transformations among structural states. The energy may be in the form of electromagnetic radiation (including infrared, optical, laser and microwave sources), electrical energy, thermal energy, chemical energy, magnetic energy, mechanical energy, particle beam energy, acoustic energy or combinations thereof using a single energy source or a plurality of energy sources. Delivery of electrical energy, for example, may be in the form of electrical current or voltage and may be continuous or in the form of a pulse whose height and width can be controlled. Optical energy may be in the form of a pulsed or continuous laser beam having a controlled wavelength, lineshape, energy and/or power. A diode laser is one example of an optical energy source suitable for use in the instant invention.

U.S. Pat. Nos. 4,653,024; 4,710,899; 4,737,934; 4,820,394; 5,128,099; 5,912,104; 5,935,672; 6,011,757 and U.S. patent application Ser. No. 10/026,395 (U.S. Pat. Appl. Pub. No. US-2002-0114256-A1) and No. 60/316,566 (provisional application) incorporated hereinabove by reference describe examples of structural states of phase change materials when used as optical recording media. These references generally describe an ability to reversibly transform a phase change material between a substantially crystalline state and a substantially amorphous state using, for example, optical excitation sources having suitable wavelengths, intensities, powers, and lineshapes. In a typical optical recording application, data cells comprising a phase change material are used to store, write or erase data. The erased state is typically a substantially crystalline state and writing occurs by providing energy in an amount sufficient to create an amorphous mark within the volume of phase change material corresponding to a data cell. Through the judicious control of the rate, amount and spatial distribution of applied energy and the thermal budget, it is possible to precisely control the shape and volume of amorphous marks formed within a data cell. Consequently, the relative volume fractions of the crystalline and amorphous states of a phase change material in a data cell may be readily and continuously varied.

U.S. Pat. Nos. 4,653,024; 4,710,899; 4,737,934; 4,820,394; 5,128,099; 5,912,104; 5,935,672; 6,011,757 and U.S. patent application Ser. No. 10/026,395 (U.S. Pat. Appl. Pub. No. US-2002-0114256-A1) incorporated by reference hereinabove further indicate that the cycling lifetime between amorphous and crystalline phases of a phase change material may be extended by incorporating a phase change material within a stack of layers. In these stacks, a phase change material is embedded within a series of layers such as dielectric layers (e.g. $SiO_2$, ZnS, $Al_2O_3$, $GeO_2$, $TiO_2$), reflective or metallic layers (e.g. Al, Au, Ag, Pt, Cu, Ti) or protective layers (e.g. acrylates, polymers). While not wishing to be bound by theory, the instant inventors believe that neighboring layers may provide supplementary mechanical support that inhibits degradation of a phase change layer upon repeated cycling through its amorphous and crystalline phases.

Illustrative phase change materials suitable for use in accordance with the instant invention are those that include one or more of the elements In, Ag, Te, Se, Ge, Sb, Bi, Pb, Sn, As, S, Si, P, O and mixtures or alloys thereof, sometimes preferably in a eutectic composition. In a preferred embodiment, the phase change material includes a chalcogen element. In a most preferred embodiment, the phase change material includes Te as the chalcogen element. Also preferred are phase change materials that include a chalcogen in combination with Ge and/or Sb such as $Ge_2Sb_2Te_5$, $Ge_4SbTe_5$, $Sb_2Te_3$ and related materials. GeTe alone or in solid solution with CdTe constitutes another preferred embodiment. In another preferred embodiment, the phase change material includes Ag and/or In; especially in combination with Sb and/or Te. Eutectic compositions within the AgInSbTe family, such as AIST, are another most preferred embodiment. In another preferred embodiment, the phase change material includes a chalcogen and a transition metal such as Cr, Fe, Ni, Nb, Pd, Pt or mixtures and alloys thereof. Some examples of phase change materials suitable for use in accordance with the instant invention are provided in the U.S. patents incorporated by reference hereinabove. Materials suitable in the context of the instant invention may also include a mixture of a dielectric material and a phase change material. Examples of such mixtures are described in commonly assigned U.S. Pat. No. 6,087,674, the disclosure of which is hereby incorporated by reference.

While not wishing to be bound by theory, the instant inventors believe that phase change materials that exhibit a change in bonding hybridization upon transformation from an amorphous phase to a crystalline phase are best suited for the instant invention. Participation of d-orbitals and transformation of d-orbitals from one hybridization scheme in one phase to a different hybridization scheme in another phase is especially believed to be beneficial in the context of the instant invention. The large changes in optical constants such as refractive index (n), extinction coefficient (k), and equivalent permittivity accompanying transformations of the instant phase change materials from an amorphous state to a crystalline state are believed to be due to changes in bonding configurations reflected by different hybridization schemes.

In the context of the instant invention, an important aspect of the instant phase change materials is their ability to store a phase taper. Storage of a phase taper may be accomplished by systematically varying the relative proportion of crystalline and amorphous regions within a layer or volume of phase change material. The ability of a phase change material to store a phase taper ultimately stems from the differences in the optical constants of the crystalline and amorphous states of the phase change material. Advantage is taken of two different ways to influence the phase of electromagnetic radiation: (1) by changing the optical path length; and (2) by changing the interfacial contribution. In (2), depending on whether the refractive index of the incident medium ($n_0$) is greater or less than that of the transmitting medium ($n_1$), the phase can be 0 or $\pi$ (i.e. 0° or 180°), respectively. These two values strictly occur only in the special case where there is no absorption in the transmitting medium; i.e. when $k_1=0$. However, when $k_1>0$, the phase can be other than 0 or $\pi$; e.g. between 0 and $\pi$. For a single interface, the contribution of a non-zero $k_1$ on the phase $\phi$ can be determined by calculating the complex Fresnel reflection coefficient, $\bar{r}_{01}$, where $$\bar{r}_{01} = \frac{\bar{n}_0 - \bar{n}_1}{\bar{n}_0 + \bar{n}_1}$$

where the bars represent complex quantities. For the complex refractive indices in medium j, $$\bar{n}_j = n_j - ik_j$$

where $n_j$ is the familiar refractive index of medium j, and $k_j$ is the extinction coefficient of medium j. Resolving $\bar{r}_{01}$ into its real and imaginary components, it can be shown that the phase angle (as given by the angle between the real and imaginary components in the complex plane) is given by $$\tan\phi = \frac{2n_0 k_1}{n_0^2 - n_1^2 - k_1^2}$$

In the limit as $k_1$ approaches zero, $\tan\phi$ approaches either +0 or −0 depending on whether $n_0 > n_1$ or $n_0 < n_1$, respectively. Clearly $\phi$ approaches either 0 or $\pi$ in these special cases. However, when $k_1 > 0$, $\phi$ differs from 0 or $\pi$ and depends on $n_0$ and $n_1$ as well. If no is not air (where $n_0 = 1$), but rather a dielectric (e.g. where $n_0 = 2$), then the phase angle can more than double.

Let us hereinafter recognize these two ways for influencing the phase angle and for convenience collectively include both effects in a more general concept of optical path length. In the following discussion, optical path length shall refer to this more general concept and shall include both ways of influencing the phase angle outlined hereinabove.

As described hereinabove, differences in the path length traversed by an incident wavefront with respect to different scattering centers influence the phase shift of reradiation of different scattering centers. Formally, the path length traversed by electromagnetic radiation must include consideration of not only the physical distance traversed, but also the properties of the medium through which electromagnetic radiation propagates. The physical distance traversed may be referred to as the physical path length and corresponds to the actual distance traveled by electromagnetic radiation as it passes from one point in space to another point. A more general concept, the optical path length, may be introduced to further account for properties of the medium through which electromagnetic radiation propagates. Specifically, the optical path length includes consideration of the influence of the refractive index n and the extinction coefficient k of a medium on the propagation of electromagnetic radiation. Although the term optical path length is used herein, it is to be understood that it refers to electromagnetic radiation in general and that it is not limited solely to electromagnetic radiation having optical frequencies.

In general, the optical path length and physical path length traversed by electromagnetic radiation are different. The two path lengths are equal in the special case where the medium through which propagation occurs has a refractive index of one and an extinction coefficient of zero with respect to the frequency of the propagating electromagnetic radiation. These conditions are approximated to a high degree, for example, for the propagation of optical frequencies through air. If the refractive index of the medium of propagation differs from one or the extinction coefficient is non-zero, the optical path length and physical path length are no longer equal. In a material such as silica glass, for example, the refractive index is about 1.5 and the optical path length differs from the physical path length. Similarly, when comparing the propagation of electromagnetic radiation in different materials that have different n or k values, the optical path length is different in the two materials when the physical distance traversed by the electromagnetic radiation is the same. Electromagnetic radiation of a particular frequency that travels 1 meter in silicon (n=3.4), for example, has a different optical path length than electromagnetic radiation of the same frequency that travels 1 meter in germanium (n=4.0).

When the optical and physical path lengths are unequal, the optical path length must formally be used when analyzing the phase angles, phase shift and phase taper associated with scattering centers in a material. Oftentimes, for convenience, the distinction between optical path length and physical path length is not made when analyzing the reflection properties of conventional reflectors. A rationalization for this practice is that in a conventional reflector, the local environments and hence the local values of n and k, of scattering centers are equivalent. Any effect of n and k is therefore uniform and leads to no differential effect along a series of scattering centers. As a result, no stored phase taper is present and the angle of incidence equals the angle of reflection in a conventional reflector.

In the instant invention, on the contrary, it is possible to store a phase taper by varying the relative proportion of crystalline and amorphous states along one or more directions of a layer or volume of phase change material. This capability accrues because the refractive index and/or extinction coefficient of the crystalline and amorphous states of a phase change material are different for most frequencies of electromagnetic radiation. As a result, the local value of n and/or k differs for regions of a phase change material having different relative proportions of the amorphous and crystalline states. Different local values of n or k influence the optical path length in the vicinity of different scattering centers to differing degrees. In the case of normally incident electromagnetic radiation, for example, the physical path length from the incident wavefront to each of a series of scattering centers at the surface of a phase change material is the same. If the volume fraction of crystallinity varies along the surface, however, the optical path length traversed by normally incident electromagnetic radiation will be different for different centers because of locally varying values of n and/or k. The locally varying values of n and/or k constitute a differential non-uniformity in the phase change material and this differential non-uniformity provides a stored phase taper in the phase change material. As a result, reflection of normally incident light does not occur normal to the scattering surface, but rather occurs at an angle dictated by the stored phase taper. A similar effect applies to incident electromagnetic radiation that approaches from any angle of incidence with the net result that the angle of reflection does not equal the angle of incidence in a phase change material having a stored phase taper due to local variations in the volume fraction of crystallinity along one or more directions. A variation in crystallinity along a particular direction may hereinafter be referred to as a crystallinity gradient.

The deviation from specular reflection depends on the magnitude of the stored phase taper. In a conventional reflecting surface, no stored phase taper is present and no deviation from specular reflection occurs. In a phase change material, the extent of the crystallinity gradient determines the magnitude of the stored phase taper and hence, the deviation from specular reflection. An indication of the deviation from specular reflection may be obtained from an approximate analysis based on FIG. 1 hereinabove. Let FIG. 1 now represent four distinct reradiating centers of the instant phase angle controlled stationary element. The condition that the separation d between reradiating centers is less than the wavelength $\lambda$ of incident electromagnetic radiation is maintained. The path length difference 1 between two points on a reflected wavefront 14 emanating from adjacent reradiating centers (for example, the centers at 0 and d) is given by $$l = d \sin\theta$$

where $\theta$ now represents the deviation in the angle of reflection from the specular direction provided by the stored phase taper. If the total number of reradiating centers along a particular direction of the phase taper is m, the total distance separating the first and last centers is given by D where $$D=(m-1)d$$

or, expressed equivalently as a multiple of the wavelength $\lambda$ $$D=n\lambda$$

where n>m−1. The total path length difference between points on the reflected wavefront 14 emanating from the first and last reradiating centers is given by L where $$L=(m-1)l=(m-1)d \sin\theta=n\lambda \sin\theta$$

The total path length L is related to the total phase angle difference $\Phi$ provided by the crystallinity gradient of the phase change material through $$\Phi = \frac{2\pi}{\lambda}L = \frac{2\pi}{\lambda}n\lambda\sin\theta = 2\pi n\sin\theta$$

where $\Phi$ is in radians. Rearranging the latter equation to solve for sin $\theta$ leads to $$\sin\theta = \frac{\Phi}{2\pi n} = \frac{\alpha}{360°n}$$

where the latter equation expresses the total phase angle difference as $\alpha$ where $\alpha$ is in degrees.

The preceding equation provides an estimate of the angular deviation from specular reflection $\theta$ provided by a particular total phase angle difference $\alpha$ provided by a stored phase taper of a particular length represented by n. As an example, consider the situation in which the total distance separating the first and last reradiating centers of a stored phase taper is twice the wavelength of the incident electromagnetic radiation. In this situation n=2. If it were further possible to achieve a total phase angle difference $\alpha$=120° with the stored phase taper, we would find from the above equation that $\theta$=±9.6°. In other words, a total phase angle difference of 120° provides angular control of 19.2° centered about the specular direction of reflection.

The total phase angle difference provided by a stored phase taper is determined by the crystallinity gradient responsible for the stored phase taper. More specifically, the range in volume fraction of crystallinity present in a phase change material determines the total phase angle difference. The phase angle of a phase change material varies with the volume fraction of crystallinity. Typically, the phase angle of a phase change material is bounded by the purely crystalline states (volume fraction of crystallinity=100%) and purely amorphous states (volume fraction of crystallinity=0%) with states of intermediate fractional crystallinity having intermediate phase angles. Thus, the phase angle difference between the crystalline and amorphous states typically determines the maximum phase angle difference possible in a stored phase taper. A stored phase taper having a crystallinity gradient that extends from a purely crystalline state to a purely amorphous state is generally expected to provide the maximum phase angle difference and therefore the greatest angular deviation from specular reflection. Stored phase tapers extending over states spanning a smaller variation in volume fraction of crystallinity provide smaller angular deviations from specular reflection. The length of the crystallinity gradient influences the angular deviation from specular reflection through n.

In the instant invention, a crystallinity gradient may be provided by controlling the volume fraction of crystallinity in a phase change material. As indicated hereinabove and in several of the references incorporated herein, the volume fraction of crystallinity of a phase change material may be readily controlled with a high degree of precision through the judicious application of energy in appropriate amounts at appropriate rates at appropriate positions within a phase change material. The whole continuum of volume fraction of crystallinity extending from 0% to 100% is achievable thereby enabling the formation of crystallinity gradients spanning virtually any range of fractional crystallinity. As a result, precise control of the angular deviation from specular reflection is achievable with the instant phase angle controlled stationary elements. The instant elements further provide a dynamic capability that permits a dynamic tuning of the angular deviation from specular reflection. The dynamic capability stems from the ability to reversibly alter the fractional crystallinity of a volume of phase change material. Interconversion between the crystalline and amorphous states of a phase change material is readily accomplished and as a result, reconfiguration of a crystallinity gradient to provide any one of several different angular deviations from crystallinity is possible in the instant invention. The total phase angle difference provided by a phase taper, for example, may be varied by varying the volume fraction of crystallinity over which the crystallinity gradient extends. A crystallinity gradient extending over a narrow range of fractional crystallinity generally provides a smaller total phase angle difference than a crystallinity gradient extending over a wide range of crystallinity. By varying the volume fraction of crystallinity at different positions along a crystallinity gradient, various total phase angle difference may be achieved. A particular crystallinity gradient is readily reconfigured to form a new gradient having a different total phase angle difference and therefore a different angular deviation from crystallinity. The speed of reconfiguration is also fast. The instant inventors estimate that the quenching of an amorphous phase occurs on a sub-nanosecond timescale and that crystallization occurs on timescales of 10–60 ns. These speeds are many orders of magnitude faster than the speeds associated with the physical motion of MEMS systems. The instant phase change materials are also stable over many reconfigurations. The instant inventors estimate, for example, that the reversibility of interconversion between the amorphous and crystalline states of a phase change material is maintained over at least $3\times10^8$ cycles.

In embodiments that include data cells, a crystallinity gradient may be viewed as a variation in the average fractional crystallinity from data cell to data cell among the data cells included with the crystallinity gradient. A crystallinity gradient includes at least two adjacent data cells that differ in average fractional crystallinity. Different average fractional crystallinities may be achieved through forming amorphous marks having different sizes in each of two or more adjacent data cells. Crystallinity gradients may extend over several contiguous data cells. The instant phase angle controlled stationary elements may include one or more crystallinity gradients which may extend in one or more directions.

Although the foregoing discussion has emphasized reflection, the principles underlying instant phase angle controlled stationary elements provide a general ability to engineer the wavefront of incident electromagnetic radiation. In addition to reflection and non-specular reflection, the instant elements may be configured to provide for focusing, defocusing, shaping, and correction of wavefronts. Representative embodiments and applications of the instant elements are provided in the examples hereinbelow.

EXAMPLE 1

In this example, a demonstration of the influence of the volume fraction of crystallinity on the phase angle variation of a phase change material is provided. The phase change material considered in this example is $Ge_4SbTe_5$. The phase change material is included in an optical stack represented by air/D1 (10 nm)/phase change material (20 nm)/D2 (110 nm)/A1 (110 nm)/substrate where D1 and D2 refer to dielectric materials (a $ZnS:SiO_2$ alloy was used for D1 and D2 for the purposes of this calculation) and layer thicknesses are included in parentheses. A calculation of the total reflectance (R), total transmittance (T), total absorbance (A), and phase angle of the optical stack was made for incident electromagnetic radiation having a wavelength of 1550 nm. The absorbance of the phase change layer and the metal layer were also computed. The selected incident wavelength is of interest for applications in telecommunications and optical data transport. In the calculation, the volume fraction of the crystalline state of the phase change material was continuously varied in such a way that the change in crystal fraction occurred over a dimension that is small compared to the wavelength of the incident electromagnetic radiation. Under these conditions, the effective optical constants of the phase change material vary in a regular way between the amorphous and crystalline endpoints. For each fractional crystallinity, a separate n and k were determined for the phase change material using the Bruggeman effective medium approximation.

Figure 2:
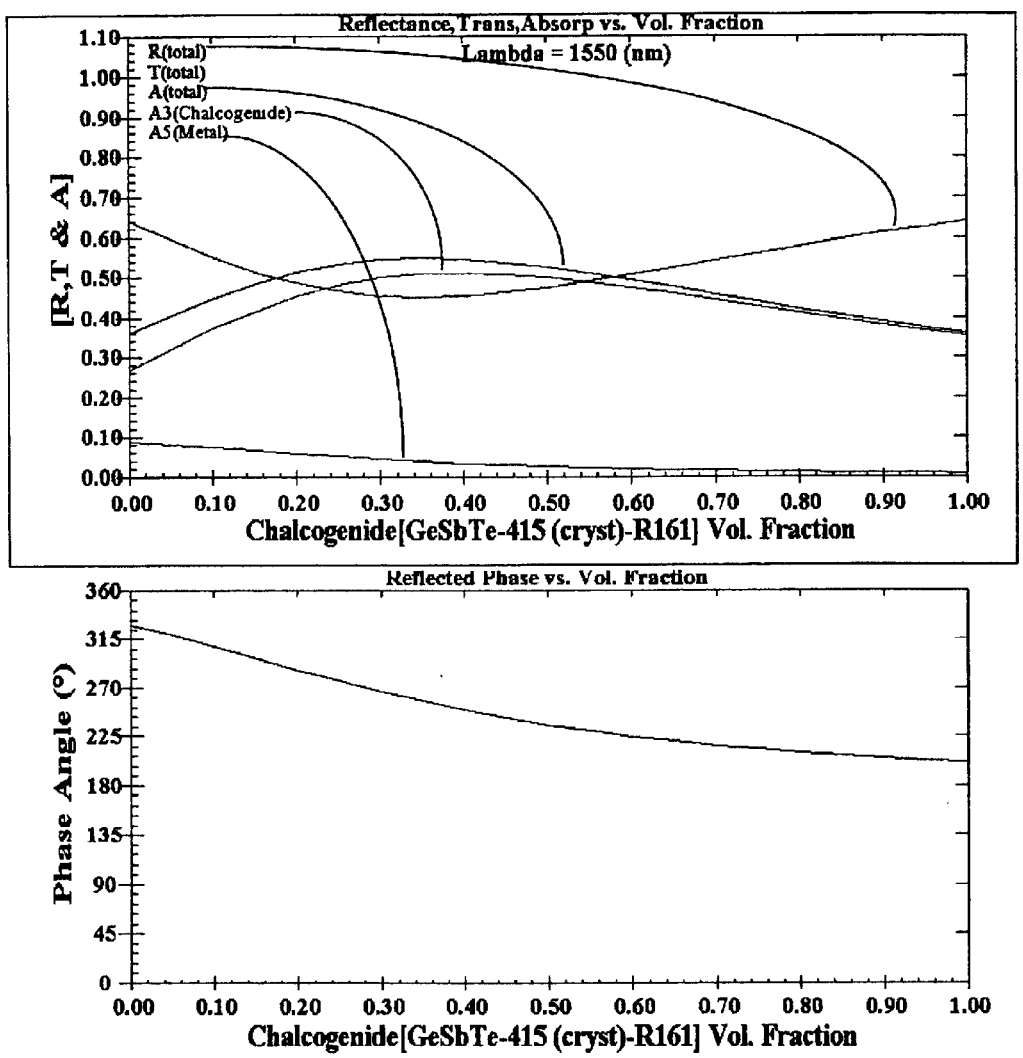
FIG. 2. Reflectance, transmission, absorbance and phase angle characteristics of a representative phase change material.

The results of the calculation are shown in FIG. 2 herein. In this example, a stored phase taper is not present in the phase change layer. Although the phase change layer contains may contain crystalline and amorphous regions in this example, they are spatially distributed in a uniform way so that no gradient in crystallinity is present. Under these conditions, specular reflection is expected from the phase change layer. The purpose of this example is to illustrate the difference in phase angle between the crystalline and amorphous states of a representative phase change material in an optical stack. The calculation shows that the phase angle decreases from 328° at the amorphous endpoint (crystalline volume fraction=0) to 200° at the crystalline endpoint (crystalline volume fraction=1.00). The difference in phase angle is therefore 128°. A crystallinity gradient formed in $Ge_4SbTe_5$ that extends from the amorphous endpoint to the crystalline endpoint may therefore provide a total difference in phase angle of 128°. If the gradient extends for two wavelengths (in this example, two wavelengths is equal to 3100 nm), then using the formula presented hereinabove, an angular deviation of ±10.2° with respect to the specular direction is determined.

In the embodiment of this example, the phase angle of the optical stack is higher when the phase change material is in its amorphous state than when it is in its crystalline state. In general, the phase angle of an optical stack may be varied by varying the design of the optical stack. The selection of materials within the stack, thicknesses of layers, number of layers, relative differences in optical constants of layers etc. are among the design parameters of an optical stack that may be varied to alter the phase angle. Due to the latitude of design possibilities for an optical stack, it is possible for a given phase change material composition to design a stack in which the phase angle of stack in which the phase change material is in either the amorphous or crystalline phases is higher than when the stack includes the phase change material in the crystalline or amorphous phase, respectively. For example, by varying the design of the optical stack in this example, it is possible to achieve a result in which the optical stack exhibits a higher phase angle when the phase change material is in the crystalline state rather than the amorphous state.

The relative phase angles of the optical stack in the crystalline and amorphous phases is relevant in determining the sense of the effect produced by a crystallinity gradient in the instant invention. If an element of the instant invention in which the phase angle of the element is higher when the phase change material is in its amorphous state produces an particular effect on incident electromagnetic radiation, the same effect in a symmetrically disposed direction is produced by an optical stack having a higher phase angle when the phase change material is in its crystalline state and the differential of the phase angle of the amorphous and crystalline states has the same magnitude. If a particular element, for example, reflects electromagnetic radiation in a leftward direction when the stack has a higher phase angle when the phase change material is in its amorphous state, the element reflects electromagnetic radiation in the rightward direction when the stack has a higher phase angle when the phase change material is in its crystalline state. Unless otherwise stated or demanded by the fact circumstances hereinbelow, the elements of the following examples presume that the element has a higher phase angle when the phase change material is in its crystalline state.

EXAMPLE 2

Figure 3A:
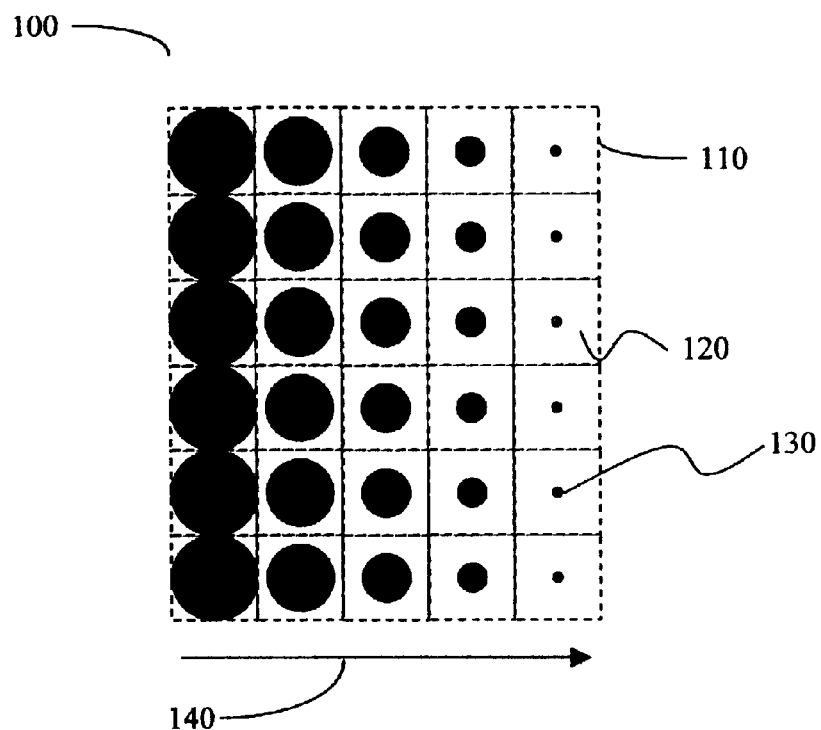
FIG. 3A. A phase angle controlled stationary element according to the instant invention.
Figure 3B:
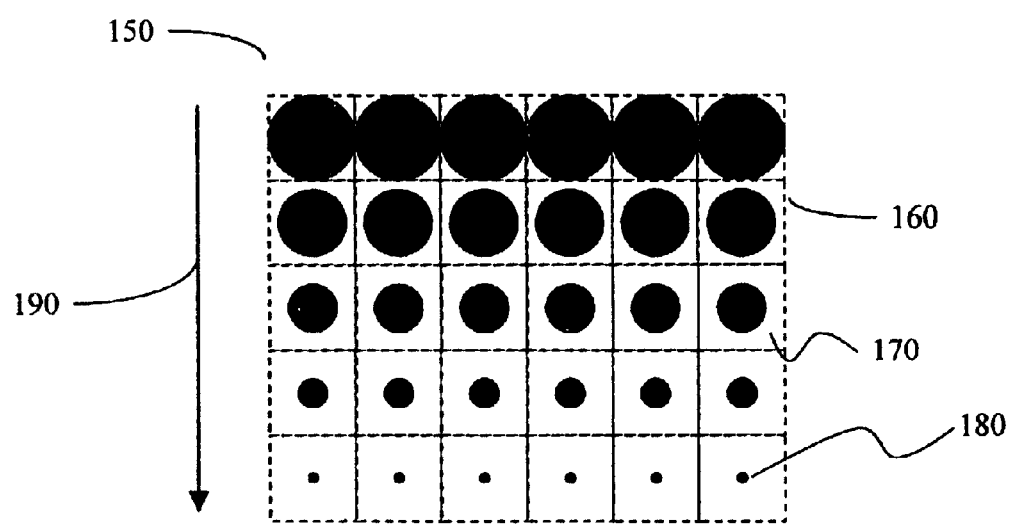
FIG. 3B. A phase angle controlled stationary element according to the instant invention.
Figure 3C:
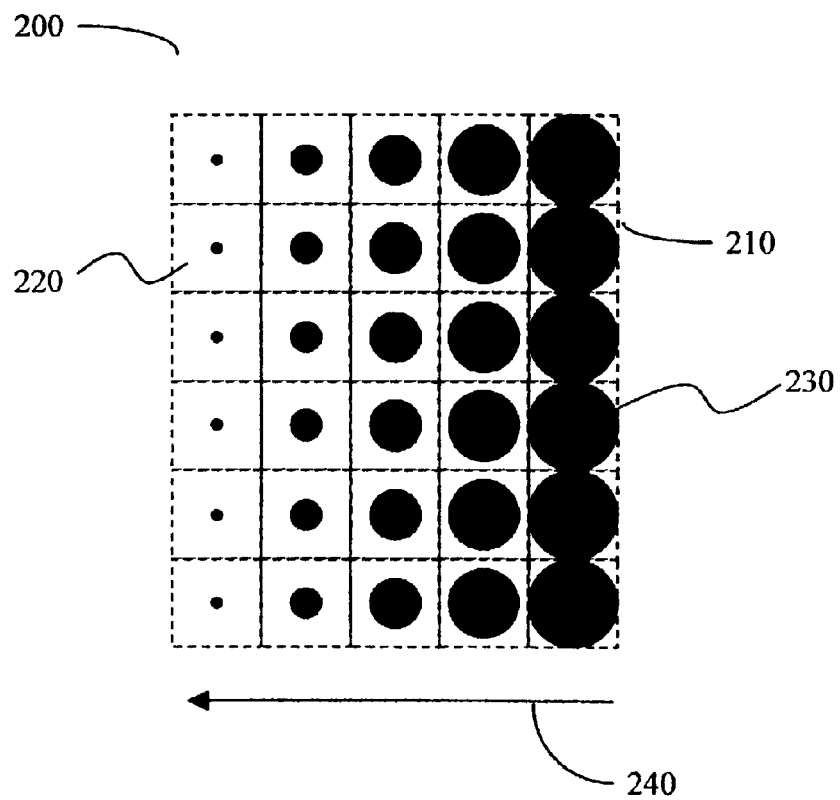
FIG. 3C. A phase angle controlled stationary element according to the instant invention.
Figure 3D:
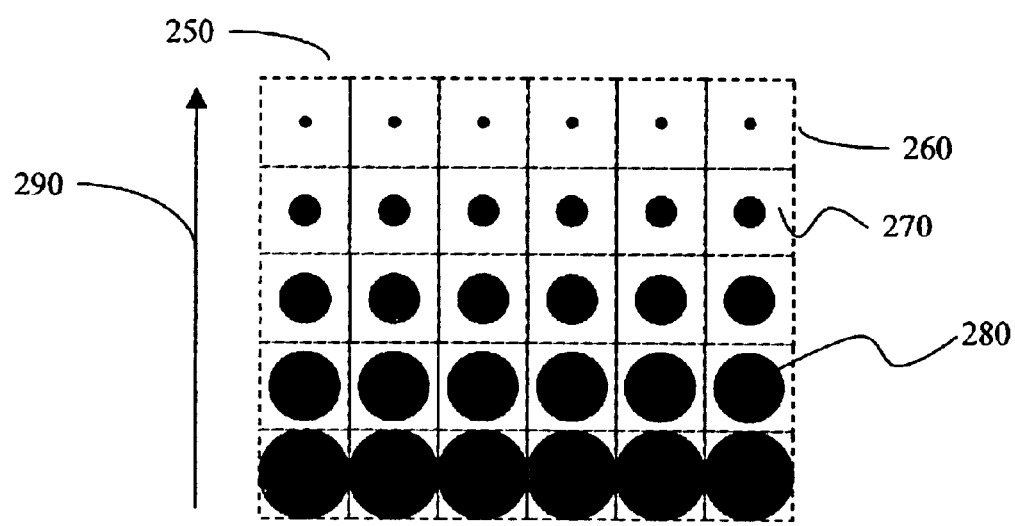
FIG. 3D. A phase angle controlled stationary element according to the instant invention.

In this example, several embodiments of an element producing non-specular reflection are provided. The elements are schematically depicted in FIGS. 3A–3D herein. These elements include a phase taper formed by providing a gradient in crystallinity in a phase change material. In FIG. 3A, the phase change material of the element 100 is divided into data cells 110. The data cells include a crystalline portion 120 and an amorphous mark 130. The crystalline portion 120 may also be referred to herein as a crystalline matrix. In FIG. 3B, the phase change material of the element 150 is divided into data cells 160. The data cells include a crystalline portion 170 and an amorphous mark 180. The crystalline portion 170 may also be referred to herein as a crystalline matrix. In FIG. 3C, the phase change material of the element 200 is divided into data cells 210. The data cells include a crystalline portion 220 and an amorphous mark 230. The crystalline portion 220 may also be referred to herein as a crystalline matrix. In FIG. 3D, the phase change material of the element 250 is divided into data cells 260. The data cells include a crystalline portion 270 and an amorphous mark 280. The crystalline portion 270 may also be referred to herein as a crystalline matrix.

The data cells of each of the embodiments of this example are approximately 500 nm on a side. The amorphous marks represent regions in which the amorphous state of the phase change material is present. The relative proportions of the crystalline and amorphous states vary in one direction in the embodiments depicted in FIGS. 3A–3D. The variation in volume fraction of the crystalline state from data cell to data cell in a particular direction constitutes a crystallinity gradient that provides a stored phase taper in the phase change material. In the embodiment of FIG. 3A, the crystallinity gradients occur in the horizontal direction with the volume fraction of crystallinity increasing from left to right (i.e. in the rightward direction). In the embodiment of FIG. 3B, the crystallinity gradients occur in the vertical direction with the volume fraction of crystallinity increasing in the downward direction.

The direction in which the one or more crystallinity gradients occur determines the directional bias provided by the stored phase taper. This bias is most easily visualized using normally incident light as an example. If normally incident electromagnetic radiation propagating from above impinges the embodiment of FIG. 3A, the reflected electromagnetic radiation is directed toward the right side of the element. The reflected radiation does not reside in the plane of the element, but rather is reflected above the plane of the element in a rightward direction. The rightward facing arrow 140 schematically depicts the rightward bias provided by the stored phase taper of the embodiment of FIG. 3A. Similarly, the downward facing arrow 190 schematically depicts the bias provided by the embodiment of FIG. 3B. Normally incident electromagnetic radiation that impinges the embodiment of FIG. 3B from above, the reflected electromagnetic radiation propagates up out of the plane of the element in the direction of the lower side of the element.

Figure 4:
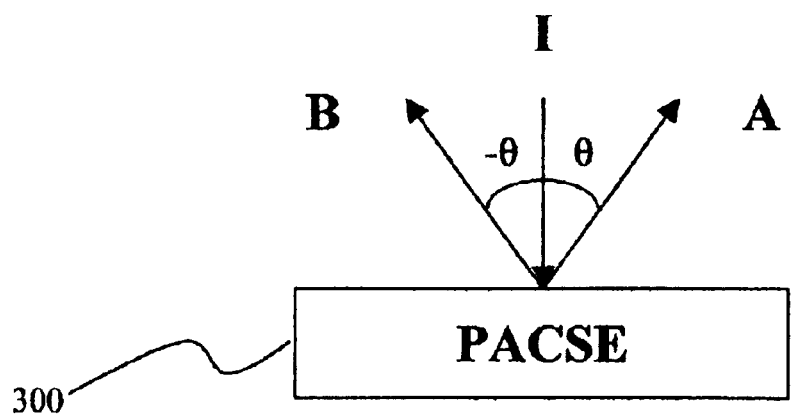
FIG. 4. Schematic depiction of reflection from a phase angle controlled stationary element according to the instant invention.

Other directions of propagation of the reflected radiation are also possible by controlling the direction of one or more crystallinity gradients. A reversal of the crystallinity gradient reverses the direction of the angular deviation from the specular direction. If each crystallinity gradient of the embodiment of FIG. 3A is reversed so that the volume fraction of crystallinity increases in the leftward direction, a stored phase taper that directs normally incident light in the direction of the left side of the element is formed. Provided that the reversed crystallinity gradient differs only in the direction of the gradient (and not, e.g. in the size or position of marks within data cells) (i.e. reversal of the crystallinity gradient may be viewed as a rotation by 180° in the plane of the page of FIG. 3A to produce the embodiment of FIG. 3C), the angular deviation from the specular direction will have the same magnitude as in the embodiment of FIG. 3A, but will occur on the opposite side of the specular direction. The arrow 240 depicts the leftward bias provided by the embodiment of FIG. 3C. FIG. 4 herein illustrates this feature of the instant element. PACSE is used herein as an abbreviation for phase angle controlled stationary element. The PACSE shown in FIG. 4 at 300 corresponds to the embodiment of FIG. 3A or 3C. Whereas FIGS. 3A–3D show a top view of the element, FIG. 4 shows a side view of the element. As in FIG. 3A or FIG. 3C, the crystallinity gradient is horizontal in FIG. 4. In FIG. 4, I denotes the direction of an incident wavefront of electromagnetic radiation. This wavefront may have a wavelength of 1550 nm, for example. A and B denote reflected electromagnetic radiation where A signifies the reflection that occurs when the crystallinity gradient is such that the fractional crystallinity increases from left to right as in the embodiment of FIG. 3A herein. Reflection B signifies the reflection that occurs when the crystallinity gradient is such that the fractional crystallinity increases from right to left as in the embodiment of FIG. 3C herein. Except for the reversal of direction, the crystallinity gradient that produces reflection B is otherwise identical with the crystallinity gradient that produces reflection A. If the angular deviation from specular reflection for the reflected radiation A is θ, then the angular deviation from specular reflection for the reflected radiation B is −θ. Similarly, if the crystallinity gradient of the embodiment of FIG. 3B is reversed, a stored phase taper that directs normally incident light in the direction of the upper side of the element is formed. This embodiment is depicted in FIG. 3D herein where the arrow 290 indicates the directional bias.

Figure 5:
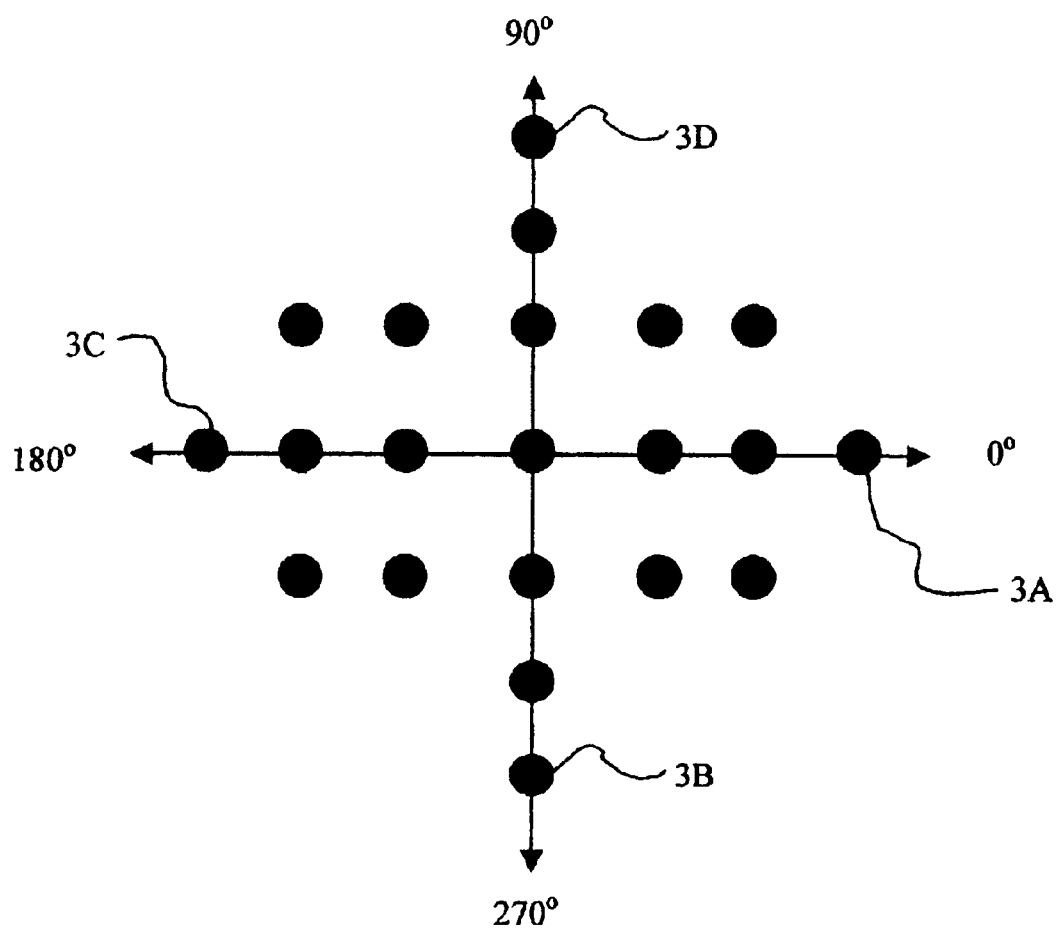
FIG. 5. Schematic depiction of representative directions and angles of reflection from a phase angle controlled stationary element according to the instant invention.

A summary of the effect of the phase angle controlled stationary elements of this example is presented in FIG. 5 herein. FIG. 5 is a two-dimensional illustration of the direction of reflection of normally incident electromagnetic radiation from the instant elements. The plane of the figure corresponds to the plane of an element. Normally incident radiation approaches from above the plane of the figure. The points indicated in FIG. 5 correspond to several selected directions of reflection of the normally incident radiation, The points correspond to terminal endpoints of projections of the vectors representing reflected radiation into the plane of the element. For the purpose of FIG. 5, each reflected vector is assumed to have a common length so that the different positions of the projected endpoints of those vectors represent differences in the direction of reflection. As an example, the direction vectors A and B described in FIG. 4 herein correspond to reflection vectors of the embodiments depicted in FIGS. 3A and 3C, respectively. These reflection vectors have a common length. The projection of the terminal endpoints of these reflection vectors provides the points labeled 3A and 3C in FIG. 5.

Two angular measures may be used to characterize the direction of reflection: an angle of reflection and an azimuthal angle. The angle of reflection may be measured relative to the normal of the element or relative to the plane of the element. As an example, the angle θ in FIG. 4 corresponds to the angle of reflection of the reflection vector labeled A relative to the normal of the element and the angle 90−θ is the angle of reflection relative to the plane of the element. The azimuthal angle accounts for the plurality of reflection vectors having a particular angle of reflection. This plurality of reflection vectors may be viewed as defining a cone of rotation about the normal to the element. Rotation of the reflection vector labeled A in FIG. 4 herein about the normal to the element, for example, produces a cone where vectors that run from the tip of the cone to the base of the cone represent different reflection vectors having a common magnitude of angle of reflection.

The two-dimensional plot presented in FIG. 5 herein is a depiction of the angle of reflection and azimuthal angle of representative reflection vectors achievable with the elements of this example. The angle of reflection is distinguished by position from the origin of FIG. 5. The point at the origin corresponds to reflection normal to the plane of the element. In the case of normally incident electromagnetic radiation, the origin is the point that corresponds to specular reflection. As the distance from the origin increases, the angle of reflection relative to the normal of the element increases. Reflections associated with points close to the origin correspond to reflections that are close to the normal of the element, while reflections associated with points far from the origin correspond to reflections that deviate significantly from the normal direction. Points having a common magnitude for the angle of reflection may be represented by circles in the two-dimensional plot of FIG. 5 where different points on the circle correspond to different azimuthal angles. Azimuthal angle may be measured with respect to a reference axis. In FIG. 5, the axis labeled 0° is selected as the reference axis. All points on the reference axis have an azimuthal angle of 0°. The axes corresponding to azimuthal angles of 90°, 180°, and 270° are also illustrated. Intermediate azimuthal angles correspond to points between the labeled axes.

Each point indicated in FIG. 5 corresponds to a reflection vector achievable through the storage of a phase taper having an appropriate direction and crystallinity gradient. By varying the pattern of marks, it is possible to obtain a reflection vector corresponding to any point in the plane of FIG. 5. Only representative points are included for the purposes of illustration and the selection of these points is not intended to limit the scope of the instant invention. Points corresponding to the embodiments of FIGS. 3A–3D are indicated in FIG. 5. The positions of these points are consistent with the directional biases described hereinabove for the embodiments. Other representative points are also included and may be obtained by forming an appropriate pattern of marks in a phase change material. Points having an azimuthal angle of 0°, for example, may be obtained by modifying the crystallinity gradient of the embodiment of FIG. 3A. A crystallinity gradient may be referred to as having a strength where the strength of a crystallinity gradient is a measure of the change in fractional crystallinity per unit distance. A weak crystallinity gradient has a less gradual change in fractional crystallinity than a strong crystallinity gradient. Points having an azimuthal angle of 0° and positioned closer to the origin than the point corresponding to the embodiment of FIG. 3A may be obtained by weakening the crystallinity gradient of FIG. 3A. This weakening may be accomplished by reforming the crystallinity gradient of the embodiment of FIG. 3A in such a way that the increase in fractional crystallinity from data cell to data cell in the left to right direction is smaller than that indicated for the embodiment of FIG. 3A. The weakened crystallinity gradient produces a reflection whose angle of reflection relative to the normal direction is smaller than that of the embodiment of FIG. 3A. Such a reflection corresponds to a point having a 0° azimuthal angle that resides between the origin and the point labeled 3A in FIG. 5. Points having a 0° azimuthal angle that are located further from the origin than the point labeled 3A have stronger crystallinity gradients than that of the embodiment of FIG. 3A. The horizontal crystallinity gradient of the embodiment of FIG. 3A extends from a not completely amorphous state to a not completely crystalline state. A reconfiguration of the crystallinity gradient so that it extends, for example, from a completely amorphous state to a completely crystalline state over the horizontal distance indicated in FIG. 3A is one way to increase the strength of the crystallinity gradient of the embodiment of FIG. 3A. Similar arguments hold for the embodiments of FIGS. 3B–3D.

Factors that influence the strength of the crystallinity gradient thus include the fractional crystallinity of the marks having the highest and lowest fractional crystallinity within a phase taper as well as the distance between these and other marks. Although not specifically shown in the examples of this embodiment, data cells that are completely amorphous or completely crystalline are also within the scope of the instant invention and may be used in forming a crystallinity gradient. The embodiments of this example show crystallinity gradients that are monotonically increasing or decreasing in one direction. Other embodiments are described hereinbelow in which crystallinity gradients vary arbitrarily in a particular direction. Embodiments in which a crystallinity gradient occurs in more than one direction are also described hereinbelow.

Figure 6:
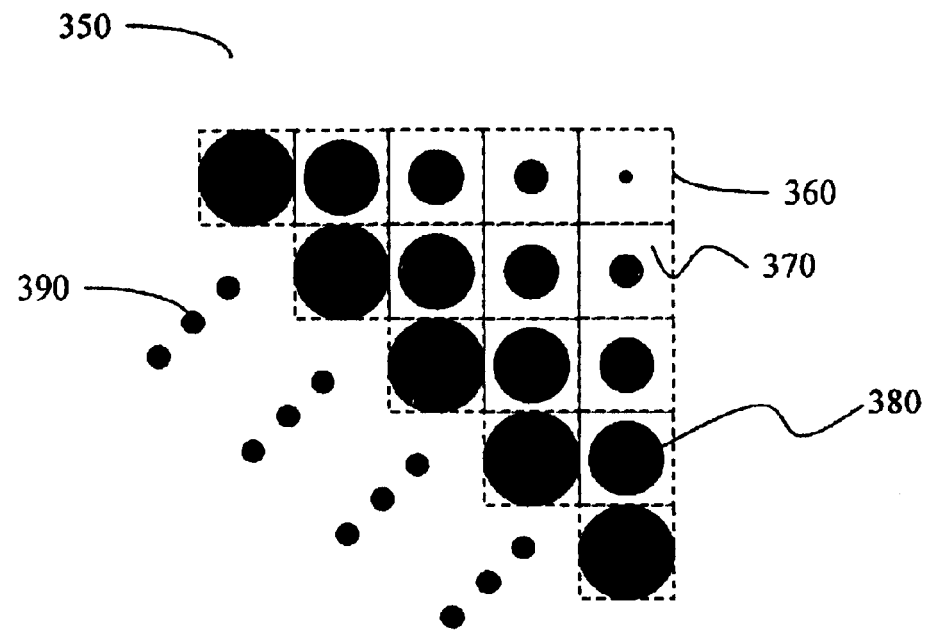
FIG. 6. A phase angle controlled stationary element according to the instant invention having a pitch corresponding to the 45° azimuthal direction.

In addition to the strength of the crystallinity gradient, the direction of the phase taper also influences the direction of reflection. The direction of the phase taper may also be referred to herein as the pitch of an element where the pitch may be defined as the direction in which the fractional crystallinity of the phase change material within an element increases. The embodiment of FIG. 3A, for example, may be said to be pitched in the 0° azimuthal direction. The pitch of an element influences the azimuthal angle of the reflection vector. The embodiments of FIGS. 3A–3D show elements that are pitched in the 0°, 90°, 180°, and 270° azimuthal directions. Intermediate azimuthal angles may be obtained from the instant stationary elements by varying the pitch of the element. As an example, FIG. 6 herein presents an element at 350 pitched to provide reflection having an azimuthal angle of 45°. The element of FIG. 6 includes a phase change material that is divided into data cells 360. The data cells include a crystalline portion 370 and an amorphous mark 380. The crystalline portion 370 may also be referred to herein as a crystalline matrix. The sets of three dots 390 are included to indicate the continuation of the pattern. By controlling the pitch and crystallinity gradient of an element, it is possible to achieve reflections corresponding to any point in the plane of FIG. 5.

Figure 7:
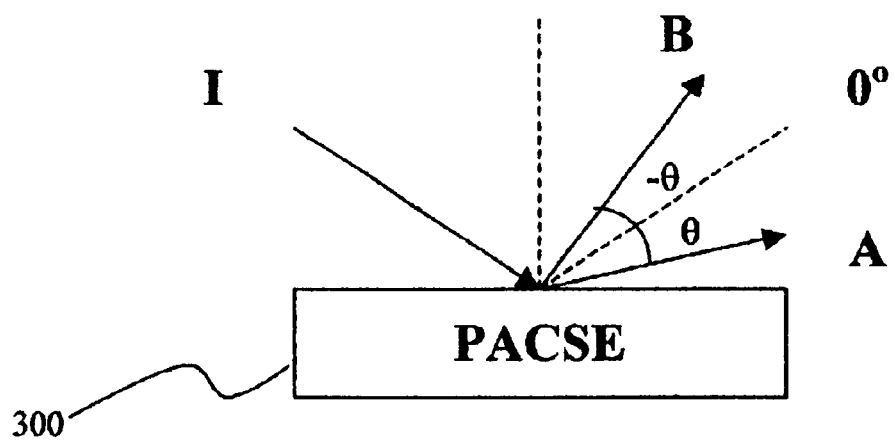
FIG. 7. Schematic depiction of the reflection of non-normally incident electromagnetic radiation from a phase angle controlled stationary element according to the instant invention.

Similar effects on the angular deviation from the specular direction occur for incident electromagnetic radiation impinging from a non-normal direction as shown in FIG. 7. The PACSE of FIG. 7 is the same as the PACSE shown in FIG. 4 and possesses a horizontal crystallinity gradient corresponding to one of the embodiments depicted in FIG. 3A or 3C hereinabove. In FIG. 7, the incident electromagnetic radiation I approaches from a non-normal angle of incidence. A dashed line signifying the direction normal to the PACSE 300 is shown. Another dashed line labeled 0° is also shown and indicates the specular direction of reflection. This line is labeled 0° to signify that it represents no deviation from specular reflection and is equivalent to the origin of FIG. 5. As in FIG. 4, the reflection labeled A is the reflection produced when the horizontal crystallinity gradient is such that the fractional crystallinity increases from left to right as in the embodiment of FIG. 3A and the reflection labeled B is the reflection produced when the horizontal crystallinity gradient is such that the fractional crystallinity increases from right to left as in the embodiment of FIG. 3C. The angular deviation from specular reflection has the same magnitude, but occurs on opposite sides of the specular direction as shown in FIG. 7. The angular deviations are accordingly labeled $\theta$ and $-\theta$.

The distribution of amorphous marks within an otherwise crystalline phase change material may hereinafter be referred to as a pattern of marks. By controlling the pattern of marks in the elements of this example, it is possible to control the direction and crystallinity gradient of a phase taper and hence it is possible to control the direction of propagation of incident electromagnetic radiation by controlling the angle of reflection and the azimuthal angle. These considerations apply to incident electromagnetic radiation approaching from normal and non-normal directions. In order for the effects of the phase taper to be manifested, it is necessary for the wavelength of incident electromagnetic to be at least as large as a linear dimension (e.g. lateral dimension, cross-sectional direction etc.) of a data cell. This condition insures that none of the amorphous marks is resolved by the incident electromagnetic radiation. Instead, only an effective average is observed and the incident electromagnetic radiation simply perceives a smooth taper in the phase angle. This condition also insures that no high order diffraction lobes occur. In the instant example, the data cells have a lateral dimension of approximately 500 nm. It is preferable therefore to use the embodiments of this example with incident electromagnetic radiation having a wavelength of at least 500 nm. Electromagnetic radiation having a wavelength of at least 1000 nm is more preferable and electromagnetic radiation having a wavelength of at least 1500 nm is most preferable. As described in more detail hereinbelow, the data cells may have arbitrary shapes including, but not limited to, circular, elliptical, rectangular, triangular or hexagonal. In these situations, the wavelength of incident electromagnetic radiation is preferably larger than a linear dimension such as a diameter, height or other cross sectional distance.

EXAMPLE 3

In this example, elements in accordance with the instant invention that provide focusing and defocusing of electromagnetic radiation are described. The elements include a phase taper formed by providing an appropriate gradient in crystallinity in a phase change material. Focusing and defocusing may be achieved, for example, through elements having a pattern of marks that include a crystallinity gradient that is not monotonically increasing or decreasing in one direction or through elements having a crystallinity gradient in two or more directions.

Figure 8A:
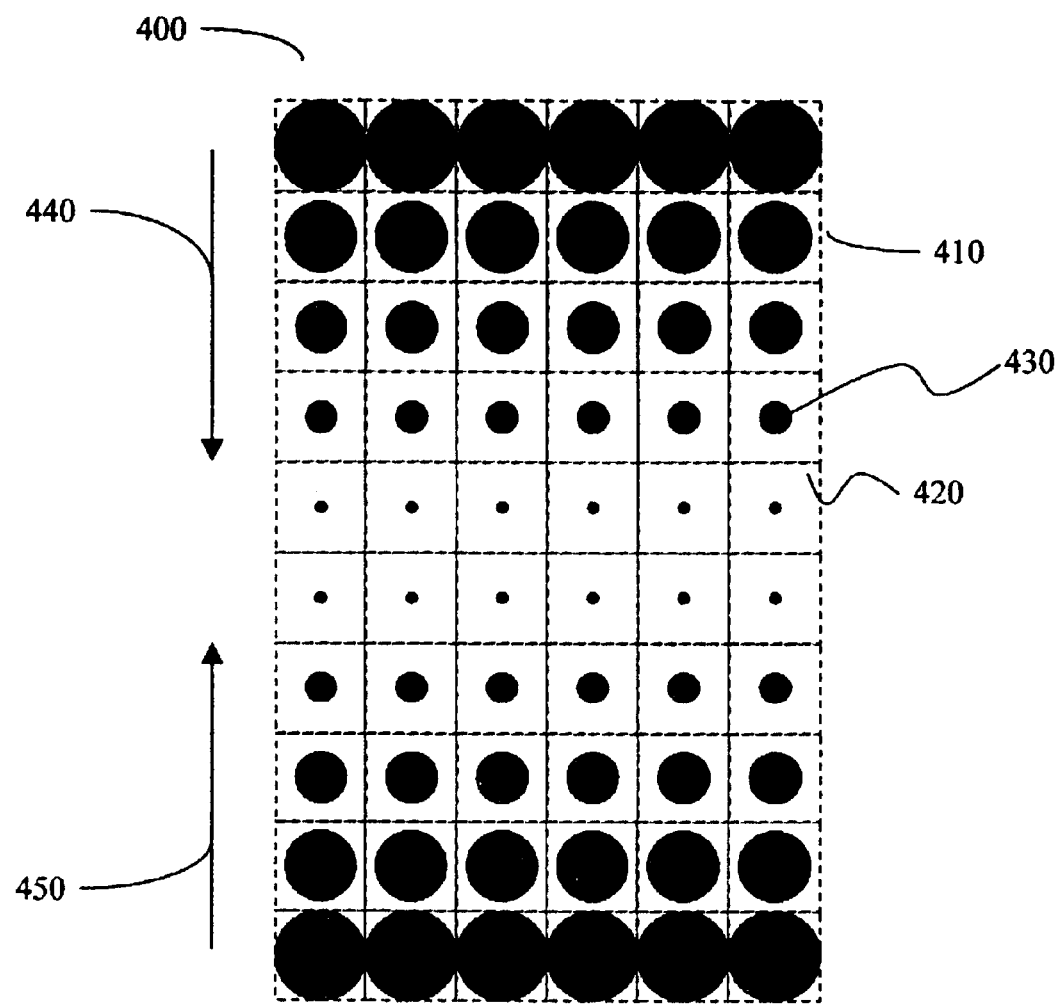
FIG. 8A. Schematic depiction of a focusing element according to the instant invention.

One embodiment of a focusing element is presented in FIG. 8A herein. The focusing element 400 includes a phase change material that is divided into data cells 410. The data cells include a crystalline portion 420 and an amorphous mark 430. The crystalline portion 420 may also be referred to herein as a crystalline matrix. The element 400 includes a crystallinity gradient in the vertical direction of the plane of FIG. 8A. The fractional crystallinity is greatest in the center two rows of the element and decreases toward the upper and lower portions of the element as shown in FIG. 8A.

Figure 8B:
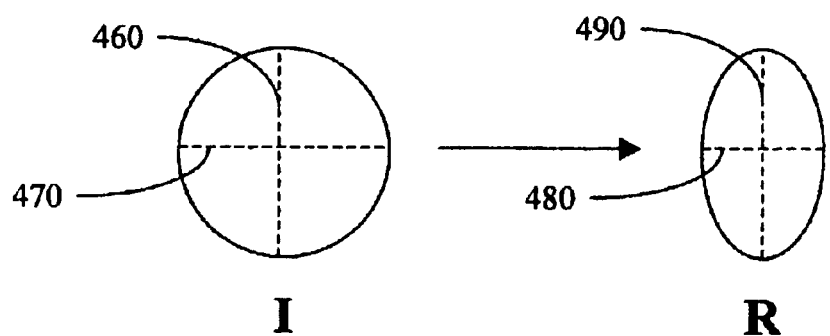
FIG. 8B. Schematic depiction of the effect of the focusing element of FIG. 8A on an incident beam having a circular cross section.
Figure 8C:
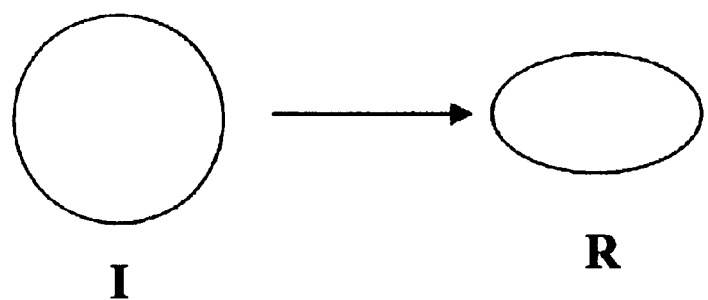
FIG. 8C. Schematic depiction of the effect of a defocusing element according to the instant invention on an incident beam having a circular cross section.

The crystallinity gradient of this example does not provide a simple directional bias to incident electromagnetic radiation, but rather provides a focusing effect in the direction of the crystallinity gradient. The focusing bias is schematically indicated by the arrows 440 and 450. The effect of the embodiment of FIG. 8A on incident electromagnetic radiation is to focus a wavefront in one direction of its cross section, but not in the other direction of its cross section. FIG. 8B illustrates the influence of the embodiment of FIG. 8A on an incident electromagnetic beam having a circular cross section. In FIG. 8B, I denotes the incident electromagnetic radiation and R denotes the reflected electromagnetic radiation. The incident electromagnetic radiation has a horizontal cross section 460 and a vertical cross section 470. If the incident electromagnetic having a circular cross section impinges the element 400 from above from the left side of FIG. 8A (e.g. propagating from the 180° azimuthal direction, where azimuthal direction is as described hereinabove), for example, the reflected radiation is directed above and toward the right side of FIG. 8A (e.g. the reflected radiation is directed toward the 0° azimuthal direction) and has a substantially elliptical cross section as indicated in FIG. 8B. The incident circular cross section is focused along its horizontal direction to provide a horizontal cross section 480 in the reflected radiation that is smaller than the horizontal cross section 470 of the incident radiation. The vertical cross section 490 of the reflected radiation is substantially the same as the vertical cross section 460 of the incident radiation. Introduction of incident light having a circular cross section to the element of FIG. 8A from the direction of the upper (e.g. from the 90° azimuthal direction) or lower (e.g. from the 270° azimuthal direction) sides of the element as depicted in FIG. 8B provides focusing of the vertical cross section rather than the horizontal cross section. FIG. 8C illustrates such a variation of the cross section.

Although the foregoing focusing examples have illustrated focusing of the horizontal and vertical cross sections, it is evident that focusing along any cross section is possible using the principles of the instant invention. Variation of the azimuthal direction from which the incident electromagnetic radiation originates and/or the pitch of the instant element may provide focusing along arbitrary cross sectional directions.

The focusing provided by the embodiment of the instant example is also symmetrical with respect to the direction of focusing. In the illustration of FIG. 8B, for example, focusing occurs along the horizontal cross section. The focusing with respect to the horizontal cross section is symmetrical in that the left and right halves of the reflected cross section are superimposable upon reflection through a central vertical plane. Similarly, the focusing illustrated in FIG. 8C is symmetrical along the direction of focusing. Symmetrical focusing may also be characterized by the presence of an inversion center of symmetry in the cross section of the reflected beam. The symmetrical focusing of this example is a consequence of the presence of two symmetry planes normal to the plane of the embodiment of FIG. 8A. (These two planes bisect the element depicted in FIG. 8A in the vertical and horizontal directions.) The presence of the two symmetry planes, in turn, is a consequence of the symmetry inherent in the particular pattern of marks formed in the element of FIG. 5A. Asymmetric mark patterns having fewer symmetry planes than in the embodiment of FIG. 8A may provide asymmetric focusing effects in which an incident electromagnetic beam having a circular cross section is reflected into an asymmetric beam having a cross section that lacks inversion symmetry. An example of an asymmetric reflected beam cross section would be a beam focused horizontally in such a way that the curvature on one side (e.g. the left side) differs from the curvature of the other side (e.g. the right side). Such an asymmetric reflected beam may be produced by an element formed by removing or altering, for example, the top row of marks from the embodiment of FIG. 8A. Removal or alteration of a row of marks removes a vertical symmetry plane of the focusing element thereby leading to differential focusing of the left and right sides of an incident beam having a circular cross section that impinges the element from an azimuthal direction of 180°.

The degree of focusing depends on the strength of the crystallinity gradient. A strong crystallinity gradient may provide for a tighter focus, while a weaker crystallinity gradient may provide for slight focusing. Varying degrees of asymmetry in focusing are also achievable by controlling the relative strengths of the crystallinity gradients in different portions of the element.

Further flexibility in controlling the cross section of electromagnetic radiation is achievable through combinations of two or more of the instant elements that are configured or oriented to provide specific focusing effects. A combination of two of the elements depicted in FIG. 8A, for example, may be used to provide a symmetrical focusing effect along two cross sections. In one combination, the element of FIG. 8A is oriented as shown in FIG. 8A and combined with the same element oriented by 90° with respect to the depiction in FIG. 8A. If incident electromagnetic radiation having a circular cross section approaches the element of the combination oriented as in FIG. 8A, a symmetric focusing effect occurs along the horizontal cross section as depicted in FIG. 8B and described hereinabove. If this reflected beam is further introduced as incident electromagnetic radiation to the second element in the combination, further symmetric focusing along the vertical cross section occurs and the net result of the two element combination is a circular beam having a smaller diameter than the original circular beam provided as incident electromagnetic radiation to the first element in the combination. Analogous symmetric and asymmetric focusing effects may be achieved through combinations of elements differing with respect to the strength of the crystallinity gradient in one or more directions, the pitch of the element and/or the direction of incidence.

Figure 8D:
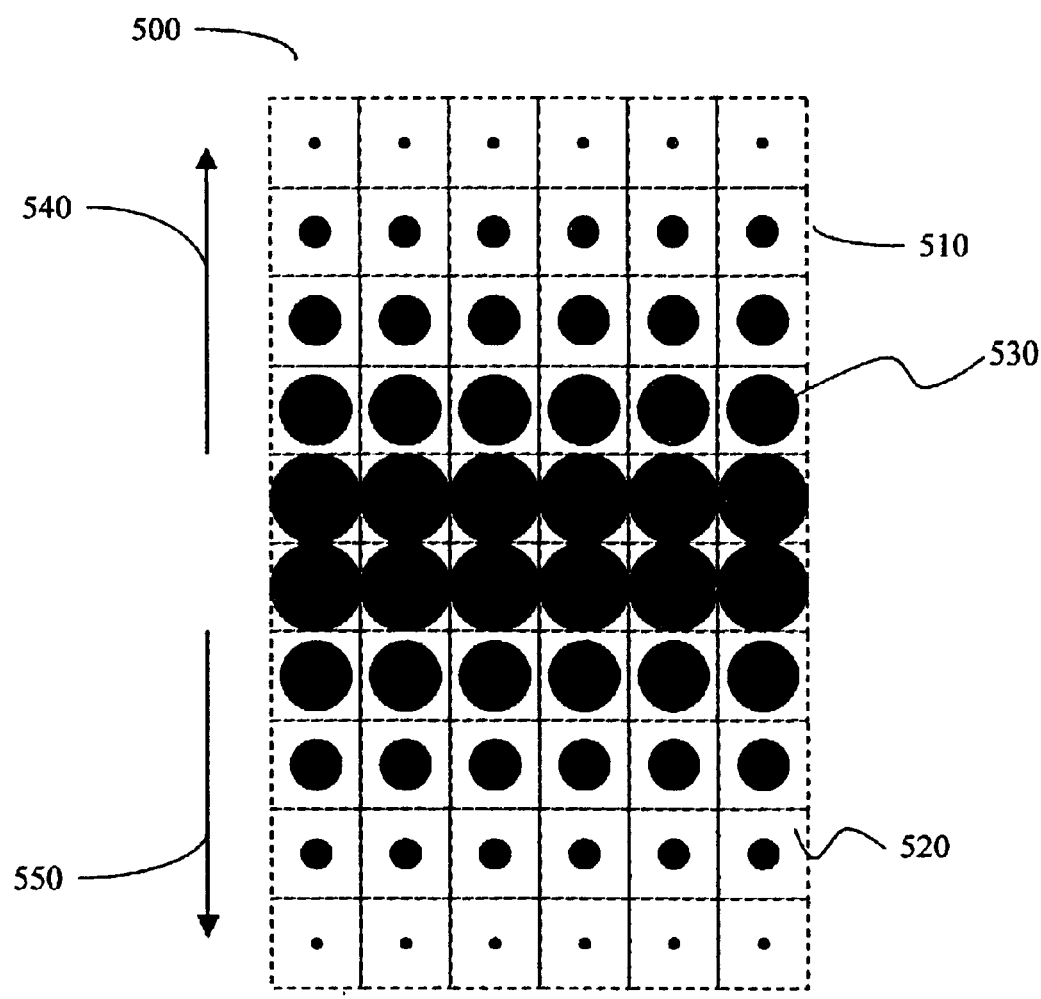
FIG. 8D. Schematic depiction of a defocusing element according to the instant invention.

The principles of the instant example also provide for a defocusing capability. Defocusing is an effect in which an incident beam cross section is enlarged in one or more directions and is achievable by forming an element in which the fractional crystallinity increases in an opposite sense when compared to the crystallinity gradient of a focusing element. As an example, a reversal of the crystallinity gradient of the focusing element depicted in FIG. 8A provides the defocusing element depicted in FIG. 8D. The defocusing element 500 includes a phase change material that is divided into data cells 510. The data cells include a crystalline portion 520 and an amorphous mark 530. The crystalline portion 520 may also be referred to herein as a crystalline matrix. The element 500 includes a crystallinity gradient in the vertical direction of the plane of FIG. 8D. The fractional crystallinity is smallest in the center two rows of the element and increases toward the upper and lower portions of the element as shown in FIG. 8D.

The crystallinity gradient of this example provides a defocusing effect on incident electromagnetic radiation in the directions of the crystallinity gradient. The defocusing bias is schematically indicated by the arrows 540 and 550. The effect of the embodiment of FIG. 8D on incident electromagnetic radiation is to defocus a wavefront in one direction of its cross section, but not in the other direction of its cross section. A defocusing effect implies an increase in the cross section. The effect of the defocusing element 500 on incident electromagnetic radiation having a circular cross section and approaching from the 180° azimuthal direction is to increase the horizontal cross section without affecting the vertical cross section to produce a reflected cross section that is wider from side to side than from top to bottom. Defocusing of the vertical cross section may also be achieved by directing incident electromagnetic radiation from the 90° or 270° azimuthal directions. As in the case of focusing described hereinabove, defocusing along an arbitrary cross section or asymmetric defocusing may be achieved by controlling one or more of the direction of incidence, direction of crystallinity gradient, element pitch etc. Defocusing elements may also be used in combination.

Although the embodiments of the focusing and defocusing elements described in this example have mostly considered incident beams having a circular cross section, it is evident that the principles presented in this example are analogously applicable to incident beams having arbitrary cross sections. Incident electromagnetic radiation having a symmetric cross section, an asymmetric cross section, a planar wavefront, a non-planar wavefront, or a distorted wavefront may be used in the context of the instant focusing, defocusing and reflecting elements.

EXAMPLE 4

In this example, symmetric focusing and defocusing with a single element is described. Symmetric focusing and defocusing may be achieved from phase angle controlled stationary elements having a pattern of marks that is circularly symmetric. An element having crystallinity gradients symmetrically disposed about a central point in at least two dimensions, for example, may provide symmetric focusing or defocusing. A representative example is provided by the element at 600 in FIG. 9 herein. The element includes a phase change material having crystalline portion 610 and amorphous portions 620 arranged in a circular pattern. Crystallinity gradients in several directions in the plane of the element are present and are symmetrically disposed about a central point. The pattern of marks may be viewed as a pattern of concentric circles. Related patterns that include additional marks on the circles are also possible.

Figure 9:
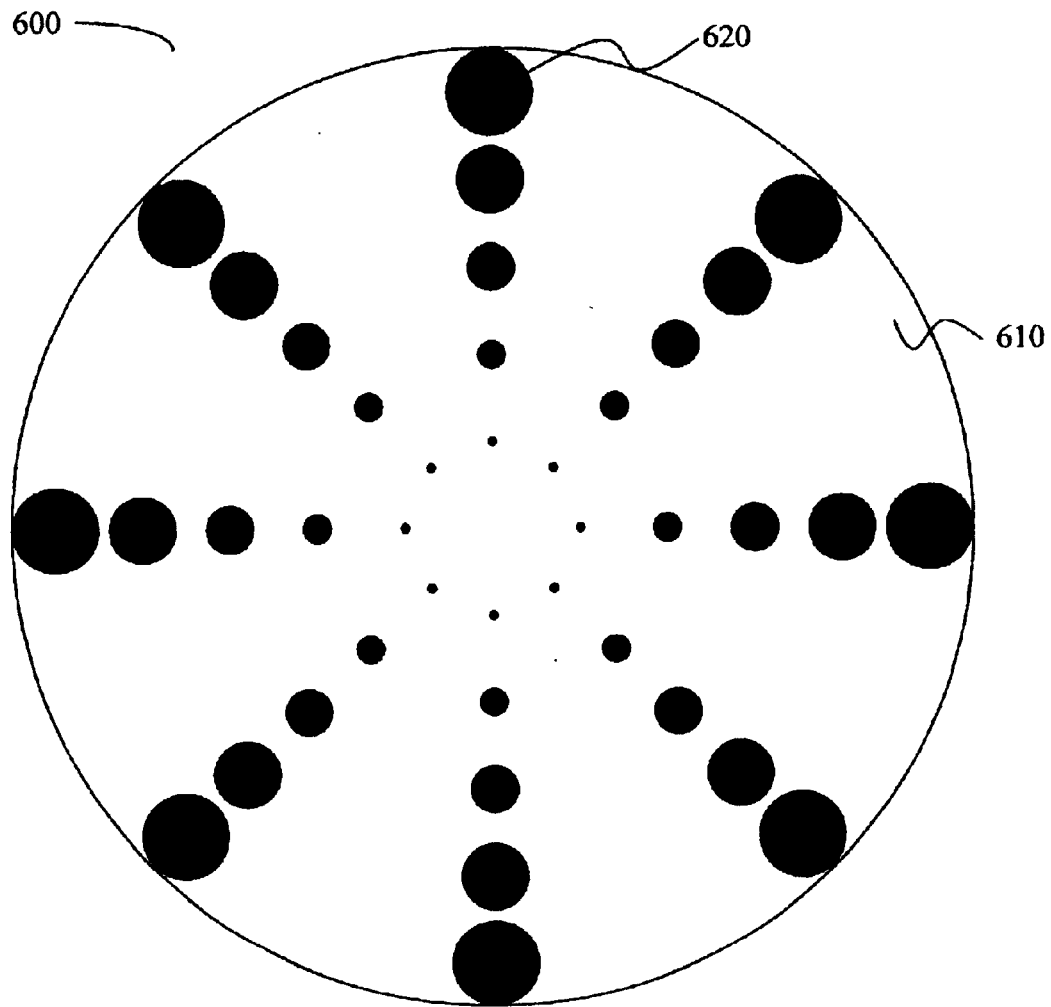
FIG. 9. Schematic depiction of a circularly symmetric focusing element according to the instant invention.

The effect of the element of FIG. 9 on incident electromagnetic radiation is a symmetric focusing. The crystallinity gradient is such that the fractional crystallinity increases radially inward. The resulting directional bias of the element is to symmetrically reduce the cross section of an incident beam of electromagnetic radiation in several directions. An incident beam having a circular cross section is reflected to provide a reflected beam having a substantially circular cross section having a smaller diameter. The degree of focusing may be controlled by varying the strength of the crystallinity gradient in each of the radial directions of the pattern. A reversal of the crystallinity gradient in the radial directions so that the fractional crystallinity increases radially outward from the center of the pattern provides an element that symmetrically defocuses an incident beam of electromagnetic radiation. An incident beam having a circular cross section, for example, may be reflected to provide a reflected beam having a substantially circular cross section with a larger diameter than the incident beam. Various degrees of focusing along different cross sectional directions may also be accomplished by varying the strength of the crystallinity gradient in one or more directions. In the embodiment of FIG. 9, the strength of the crystallinity gradient is the same in the different radial directions. Other embodiments in which the strength of the crystallinity gradient varies in different radial directions are also within the scope of the instant invention and may provide for asymmetric modification of the cross section of an incident electromagnetic beam.

EXAMPLE 5

In this example, wavefront correction is described. The principles set forth in the foregoing examples illustrate a general ability to engineer or otherwise manipulate the wavefront, cross section, propagation characteristics etc. of electromagnetic radiation. The specific examples considered represent relative simple applications of the instant phase angle controlled stationary elements in that simple reflection, redirection, focusing and defocusing effects are provided and where the effect may be obvious from consideration of the wavefront, cross section or other characteristics of the incident electromagnetic radiation in combination with the pattern of marks present in an element.

The full scope of the invention further includes incident electromagnetic radiation having arbitrary wavefronts, arbitrary cross sections, arbitrary intensity distributions etc. as well as elements having an arbitrary pattern of marks, including asymmetric patterns, crystallinity gradients with variable strengths, localized crystallinity gradients, etc. Such patterns of marks provide a general capability to refine, globally or selectively, incident electromagnetic radiation. Oftentimes, for example, it is desired to correct an aberration in an incident wavefront. A wavefront, for example, that is intended to be planar may have a distortion causing a deviation from wavefront planarity. Such a distortion may be removed within the scope of the instant invention by providing an element that locally influences the distorted incident wavefront at the point of the distortion in such a way as to compensate for the distortion (e.g. provide a corrective distortion having an opposing phase or other canceling influence on the distortion) without affecting the portions of the wavefront away from the distortion. Such an element, for example, may include large regions in which no stored phase taper is present in combination with localized regions having a stored phase taper designed to remove or otherwise correct a distortion in the incident wavefront. The localized phase taper may influence distortions through redirection, focusing or defocusing, phase angle modification etc. in such a way that the distortion is brought into conformity with the desired wavefront characteristics. A specific pattern of marks formulated to correct or otherwise compensate an arbitrary distortion may be designed by controlling the direction, strength, length etc. of one or more crystallinity gradients. Elements having two or more localized phase tapers may be utilized to correct two or more distortions in an incident wavefront.

EXAMPLE 6

In this example, an apparatus for forming a pattern of marks is described. The formation of marks having well defined shapes and positions provides the flexibility and control of the stored phase tapers that are utilized in the instant invention. The considerations relevant to forming marks having specific sizes and shapes have been previously discussed in U.S. Pat. Nos. 4,653,024; 4,710,899; 4,737,934; 4,820,394; 5,128,099; 5,912,104; 5,935,672; 6,011,757 and U.S. patent application Ser. No. 10/026,395 (U.S. Pat. Appl. Pub. No. US-2002-0114256-A1) and No. 60/316566 (provisional application) incorporated by reference hereinabove. Further information may be found in an article by David V. Tsu and David Strand that was published in *Optical Data Storage* 2001 (edited by Terril Hurst and Seiji Kobayashi), Proc. of SPIE vol. 4342, p.124ff (2002), the disclosure of which is hereby incorporated by reference. These references generally describe an ability to reversibly transform a phase change material between a substantially crystalline state and a substantially amorphous state using, for example, optical excitation sources having suitable wavelengths, intensities, powers, and temporal profile (e.g. pulse width etc.). Through the judicious control of the rate, amount, spatial distribution and temporal characteristics of applied energy and the thermal budget of the mark formation process, it is possible to precisely control the shape, dimensions and volume of amorphous marks formed within a crystalline matrix of phase change material.

In the instant invention, it is preferable for marks to be formed by a wavelength of electromagnetic radiation that is shorter than the wavelength of incident electromagnetic radiation that is to be manipulated by the elements of the instant invention. The wavelength of electromagnetic radiation used to form marks may hereinafter be referred to as the addressing wavelength and the wavelength of incident electromagnetic radiation that is manipulated by the instant elements may hereinafter be referred to as the operational wavelength. A shorter addressing wavelength facilitates formation of smaller mark features through the relation $$d_{mark} \sim \frac{\lambda}{2NA}$$

where $d_{mark}$ is a characteristic mark dimension related to read back resolution, $\lambda$ is the addressing wavelength and NA is the numerical aperture of the objective lens used to provide the addressing electromagnetic radiation. NA is dependent on the optical system used for addressing. For a given optical system, the characteristic mark dimension is seen to decrease with decreasing addressing wavelength. Shorter addressing wavelengths therefore provide for finer control of mark size, shape and positioning. At the same time, as mentioned hereinabove, the operational wavelength is preferably longer than the mark feature size so that the operational wavelength does not resolve individual marks, but rather experiences an effective average.

The characteristic mark dimension described hereinabove is one consideration in the formation of a mark. The temporal characteristics of mark formation are another important consideration. The characteristic mark dimension is not instantaneously achieved, but rather evolves over time. By controlling the time of exposure of a phase change material to mark forming electromagnetic radiation, it is possible to exercise control over the size of a mark and specifically, to achieve marks with dimensions smaller than the characteristic mark dimension described hereinabove. Further details of the mark formation process are provided in the references incorporated hereinabove.

Figure 10:
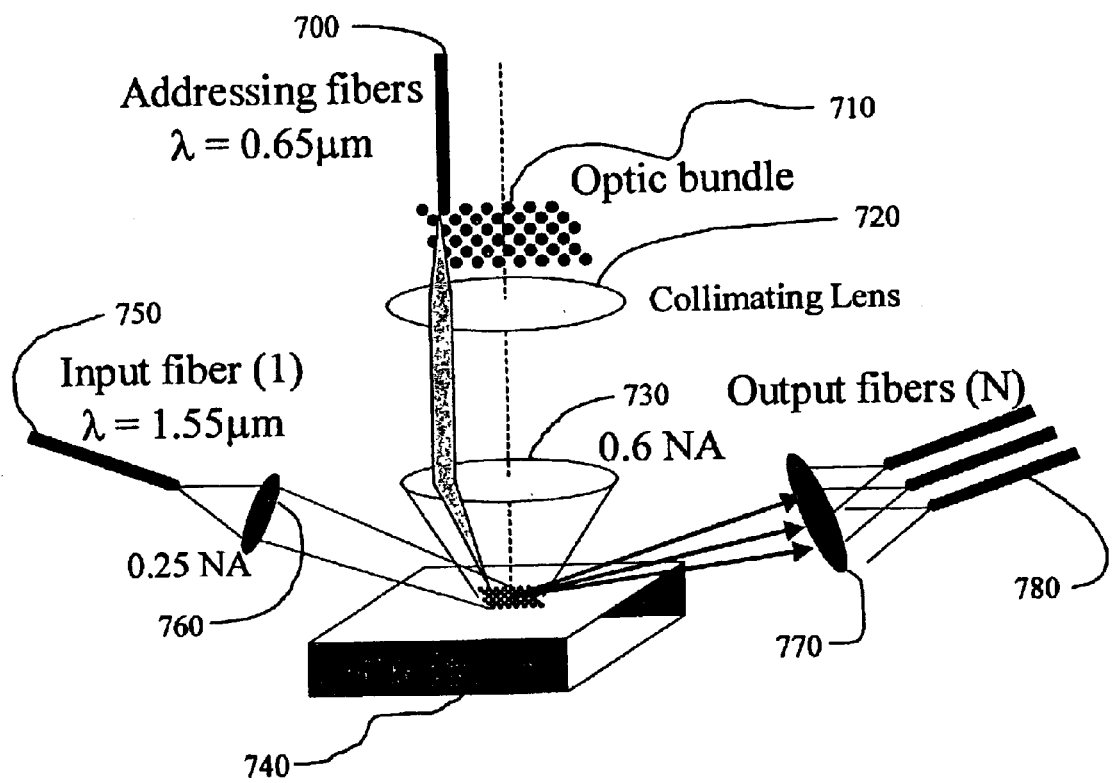
FIG. 10. An addressing apparatus for forming marks.

A representative apparatus for forming marks is depicted in FIG. 10 herein. In a preferred embodiment, marks are formed with optical means and a number of independently controlled addressing optical fibers delivers the addressing light to the phase change material or to individual data cells therein. In the embodiment of FIG. 10, light having a wavelength of 650 nm (0.65 μm) is used as the addressing light and is transmitted through one or more addressing fibers 700 that are included in an optic bundle 710. The addressing light is preferably provided by a laser and most preferably by a pulsed laser. One or a plurality of addressing light sources may be used. A single light source may be rastered from data cell to data cell to provide a pattern of marks. In a preferred embodiment, a separate pulsed laser source is used for each addressing fiber. Use of multiple addressing light sources is preferable because it eliminates the need to provide the physical translation necessary to raster a single addressing light source. Physical translation is slow and is a limiting factor in the time required to form a pattern of marks. When multiple addressing light sources are used, mark formation time governs the overall speed.

The addressing light passes through a series of optics and is ultimately focused onto a phase angle controlled stationary element according to the instant invention. In the embodiment of FIG. 10, the optics include a collimating lens 720 and a 0.6 NA objective lens 730. The upper limit characteristic mark size using this combination of addressing wavelength and objective lens is about 540 nm and is comparable to the 500 nm dimension for the data cells in the PACSE 740 shown in FIG. 10. If the addressing fibers 700 are spaced 50 μm apart, then the optics must have an overall magnification of about 100 to establish 500 nm data cell dimensions. Marks having dimensions smaller than the upper limit characteristic mark size may be formed, for example, through suitable selection the power and duration of laser pulses. Using a 650 nm addressing wavelength provided by a pulsed laser, the instant inventors have produced marks as small as 150 nm in diameter. A wide range of marks sizes is therefore available for the purposes of forming crystallinity gradients.

The incident electromagnetic radiation in the embodiment of FIG. 10 has a wavelength of 1.55 μm (1550 nm) and is provided by input fiber 750. The incident radiation departs the input fiber, passes through a 0.25NA lens 760 and is directed to the PACSE 740, which includes a phase change material and controls the characteristics and propagation of the reflected radiation according to the principles described hereinabove. In the embodiment of FIG. 10, the reflected radiation is directed into one of N directions and is focused by a lense 770 before entering one of a series of output fibers 780. By reconfiguring the phase taper of the PACSE 740, reflection in any one of N directions is possible and collection by any one of the N output fibers is possible. Hence, the apparatus of FIG. 10 provides a beam steering capability and may be referred to as a 1×N beam steering switch as one input fiber provides electromagnetic radiation that may be directed to any one of N output fibers. The reconfigurability of the phase angle controlled stationary element through control of the phase taper by controlling the mark pattern within a phase change material provides for a beam steering capability without the need for moving parts. This is an advantageous feature of the instant invention.

The embodiment of FIG. 10 is representative of mark formation apparatuses that fall within the scope of the instant invention. Apparatuses having other or more optical components for directing the addressing electromagnetic radiation onto a phase angle controlled stationary element are also included within the scope of the instant invention. Inclusion of, for example, beam splitters, polarizing elements, filters, dichroic elements, lenses, prisms etc. or combinations thereof may be included to influence the characteristics of the cross section, intensity, polarization, direction of propagation, etc. of the addressing electromagnetic radiation.

It is also preferable to provide correspondence between the packing geometry of the addressing fibers and the data cell geometry of the phase angle controlled stationary element. High packing densities of addressing fibers are achieved by organizing the addressing fibers in a hexagonal arrangement in the optic bundle. When hexagonally arranged addressing fibers are used, it is preferable for the data cells to be hexagonal in shape. This may be achieved, for example, through a triangular lattice of mark centers. A square arrangement of addressing fibers in the optic bundle is preferred for square data cells. Any arrangement of addressing fibers, however, may be used with any data cell geometry and, as indicated in more detail hereinbelow, data cells per se are not required.

In another preferred embodiment, a diagnostic capability is provided by a mark formation apparatus. Achievement of mark patterns necessary to effect control of incident electromagnetic radiation according to the principles described hereinabove requires an ability to precisely control the size, shape and positioning of marks. It is preferable to be able to probe mark characteristics during mark formation and to provide diagnostic feedback that may be used to refine, modify or otherwise alter the mark formation process to insure that the pattern of marks meets the specifications required to produce a particular effect on incident electromagnetic radiation.

In the instant invention, a diagnostic capability may be achieved through a contrast in reflectivity at the addressing wavelength. The amorphous and crystalline states of most phase change materials exhibit different reflectivities at many addressing wavelengths and this difference in reflectivity may be used to discriminate between amorphous and crystalline portions of a phase change material. A reflectivity contrast may be used, for example, to detect the boundaries of an amorphous mark within a crystalline matrix. By monitoring the evolution of the boundaries of a mark during mark formation, it is possible to insure that individual marks having desired shape characteristics and positions are formed in accordance with the crystallinity gradients or phase tapers required to achieve a particular effect.

A portion of the addressing electromagnetic radiation is reflected upon interaction with a phase change material and is redirected in the direction in which it originated. By including a beam splitter in the optics used to deliver the addressing electromagnetic radiation, the reflected addressing radiation may be directed toward a detector such as a CCD (charge coupled device) and monitored. Comparison of the reflected intensity with the reflected intensity of the crystalline and amorphous phases provides an indication of whether the phase change material that produced the reflected addressing radiation is in the crystalline or amorphous state. This information may be provided as feedback to the addressing system and the mark formation process may be adjusted accordingly to insure proper mark positioning and characteristics. The positioning, power, pulse duration etc. of a laser used to provide addressing radiation may, for example, be adjusted in response to feedback of reflectivity data. The ability to probe individual marks and/or data cells may be accomplished at the addressing radiation because this radiation has a sufficiently short wavelength, in combination with an optical system, to resolve individual regions or marks within a phase change material. The operational wavelength, on the other hand, is unable to resolve individual data cells, but rather experiences an average as described hereinabove.

In further embodiments, the addressing electromagnetic radiation and operational electromagnetic radiation are applied on opposite sides of a phase change material. These embodiments provide greater variability in the angle of incidence of the operational radiation because the addressing components do not partially occlude the spatial access to an element. By positioning the addressing components on one side of an element and introducing operational radiation from the other side, the full range of incidence angles becomes available to the operation electromagnetic radiation.

The examples and embodiments presented and described hereinabove are representative of the instant invention. A few additional comments are ubiquitously applicable to all examples and embodiments within the scope of the instant invention. First, although many of the examples and embodiments described hereinabove include data cells, data cells per se are not required for the practice of the instant invention. Data cells may instead be viewed as useful constructs for defining, forming, describing and/or localizing the pattern of marks contained within a phase angle controlled stationary element. In several of the foregoing examples, data cells having a square shape are included. These data cells are not required. The pattern of marks is responsible for the effects produced by the instant elements on incident electromagnetic radiation. EXAMPLE 4 described hereinabove, for example, provides an illustration of an embodiment in which data cells are not included. Similarly, if data cells are included, there is no requirement for them to have a square shape. Data cells having rectangular, triangular, hexagonal and other shapes are possible, operable and fully within the scope of the instant invention. In EXAMPLE 6 hereinabove, for example, situations in which hexagonal or triangular data cells may be advantageous are described. Furthermore, when data cells are included, there is no requirement for marks to be centered therein. Marks displaced from the central positions of data cells are operable within the scope of the instant invention. Marks may also be of any shape and are not required to be circular in shape as shown in several of the illustrative embodiments hereinabove.

Second, a key advantage of the instant elements is the ability to reconfigure the pattern of marks included therein to alter, tune or otherwise modify the performance over very short time scales without the need for physically motion. Reconfiguration is achieved by controlling the phase taper characteristics of an element through control of the crystallinity gradient in one or more directions. The ability to reversibly transform a phase change material between its crystalline and amorphous states provides a dynamic reconfiguration capability for the instant elements. By using a mark formation apparatus such as that described in EXAMPLE 6 hereinabove, a pattern of marks may be reconfigured rapidly to dynamically vary the functionality of the instant elements. Alteration of the direction of reflection, focusing/defocusing characteristics, wavefront correction capabilities etc. may be achieved through reconfiguration. An element initially configured to control the direction of reflection, for example, may be reconfigured to provide a different direction of reflection or different degree of focusing or different ability to correct wavefront aberrations. The instant elements provide a versatile wavefront engineering capability that provide a variety of effects on incident electromagnetic radiation. As described hereinabove, these effects include redirection, steering, focusing, defocusing, wavefront correction and superpositions thereof. As an example of a superposition effect, an element that both steers and focuses an incident electromagnetic wavefront is readily achievable with principles of the instant invention.

Third, the phase change material included in the instant elements may be used alone or in combination with one or more additional layers in an optical stack. These additional layers may include dielectric layers, reflecting layers, protective layers, substrates etc. EXAMPLE 1 hereinabove presents one illustration of an optical stack within the scope of the instant invention. The phase change material need not be present in the form of a layer. Disconnected regions of a phase change material may be appropriately dispersed within a surrounding medium to provide a phase angle controlled stationary element in accordance with the instant invention.

The disclosure and discussion set forth herein is illustrative and not intended to limit the practice of the instant invention. Numerous equivalents and foreseeable variations thereof are envisioned to be within the scope of the instant invention. It is the following claims, including all equivalents, in combination with the foregoing disclosure, which define the scope of the instant invention.

We claim:

1. A phase angle controlled stationary element for modifying the wavefront of incident electromagnetic radiation to produce reflected electromagnetic radiation, said element comprising a phase change material, said phase change material having a crystalline state and an amorphous state, said phase change material including a plurality of data cells, said data cells having no cross-sectional dimension that exceeds the wavelength of said incident electromagnetic radiation, said data cells comprising a matrix of said crystalline state of said phase change material with one or more marks dispersed therein, each of said marks consisting essentially of said amorphous state of said phase change material, all of said marks forming a pattern in said phase change material, said pattern providing one or more crystallinity gradients, said crystallinity gradients extending over at least two of said data cells, each of said at least two data cells of said crystallinity gradient having a different fractional crystallinity, said crystallinity gradients providing a stored phase taper, said stored phase taper influencing the phase angle at two or more different positions of said incident wavefront to differing extents to provide said reflected radiation.

2. The element of claim 1, wherein said reflected radiation is reflected in a non-specular direction.

3. The element of claim 1, wherein said reflected radiation is focused or defocused.

4. The element of claim 1, wherein said wavefront of said incident electromagnetic radiation includes a distortion and said distortion is corrected by said element.

5. An apparatus for forming the element of claim 1 comprising a source of addressing electromagnetic radiation, said addressing radiation having sufficient energy to form said marks.

6. The element of claim 1, wherein said phase change material comprises an element selected from the group consisting of In, Ag, Te, Se, Ge, Sb, Bi, Pb, Sn, S, P, Si, and O.

7. The element of claim 6, wherein said phase change material further comprises a transition metal.

8. The element of claim 1, wherein said phase change material comprises a chalcogen.

9. The element of claim 1, wherein said phase change material comprises Te.

10. The element of claim 9, wherein said phase change material further comprises Ge, Sb or Cd.

11. The element of claim 1, wherein said phase change material comprises Ag and In.

12. The element of claim 11, wherein said phase change material further comprises Sb or Te.

13. The element of claim 1, wherein no cross-sectional dimension of said data cells exceeds one-half of the wavelength of said incident electromagnetic radiation.

14. The element of claim 1, wherein no cross-sectional dimension of said data cells exceeds one-third of the wavelength of said incident electromagnetic radiation.

15. The element of claim 1, wherein no cross-sectional dimension of said data cells exceeds one-fourth of the wavelength of said incident electromagnetic radiation.

16. The element of claim 1, wherein each of said data cells include only one of said marks.

17. The element of claim 16, wherein each of said marks is centered in each of said data cells.

18. The element of claim 1, wherein said marks are substantially circular in shape.

19. The element of claim 1, wherein said pattern of marks is symmetric with respect to one or more symmetry planes, said symmetry planes being normal to said element.

20. The element of claim 1, wherein said pattern of marks is symmetric with respect to an inversion center.

21. The element of claim 1, wherein said crystallinity gradients extend in two or more directions.

22. The element of claim 1, wherein said crystallinity gradients extend over a distance corresponding to at least half of the wavelength of said incident electromagnetic radiation.

23. The element of claim 1, wherein said crystallinity gradients extend over a distance corresponding to at least the wavelength of the said incident electromagnetic radiation.

24. The element of claim 1, wherein said crystallinity gradients extend over a distance corresponding to at least twice the wavelength of the said incident electromagnetic radiation.

25. The element of claim 1, wherein said crystallinity gradients extend over data cells whose fractional crystallinities vary from substantially amorphous to substantially crystalline.

26. The element of claim 1, wherein said stored phase taper provides a total phase angle difference of at least 45°.

27. The element of claim 1, wherein said stored phase taper provides a total phase angle difference of at least 90°.

28. The element of claim 1, wherein said stored phase taper provides a total phase angle difference of at least 128°.

29. The element of claim 1, wherein said element further comprises a dielectric layer.

30. The element of claim 29, wherein said dielectric layer comprises ZnS.

31. The element of claim 1, wherein said element further comprises a reflective layer.

32. The element of claim 1, wherein said element further comprises data cells that are hilly amorphous or fully crystalline.

33. The element of claim 1, wherein said data cells are square, rectangular, circular, triangular or hexagonal in shape.

34. The element of claim 2, wherein said non-specular direction is a direction having a specular angle of reflection and a non-specular azimuthal angle.

35. The element of claim 2, wherein said non-specular direction is a direction having an angle of reflection that differs from the specular angle of reflection by at least 5°.

36. The element of claim 2, wherein said non-specular direction is a direction having an angle of reflection that differs from the specular angle of reflection by at least 10°.

37. The element of claim 2, wherein said non-specular direction is a direction having an angle of reflection that differs from the specular angle of reflection by at least 20°.

38. The element of claim 3, wherein said reflected radiation is focused or defocused asymmetrically.

39. The element of claim 4, wherein said distortion is a non-planar distortion and the wavefront of said reflected electromagnetic radiation is planar.

40. The apparatus of claim 5, wherein said source of addressing electromagnetic radiation comprises a laser.

41. The apparatus of claim 40, wherein the wavelength of said laser is shorter than the wavelength of said incident electromagnetic radiation.

42. The apparatus of claim 5, wherein said source of addressing electromagnetic radiation comprises a plurality of lasers.

43. The apparatus of claim 5, further including one or more addressing optical fibers, wherein said addressing electromagnetic radiation is transmitted to said element through said one or more addressing fibers.

44. The apparatus of claim 43, wherein said addressing optical fibers are arranged in a hexagonal arrangement.

45. The apparatus of claim 5, further comprising one or more operational optical fibers, wherein said incident electromagnetic radiation is transmitted to said element through said one or more operational fibers.

46. The apparatus of claim 5, further comprising one or more output optical fibers, wherein said element directs said reflected radiation to at least one of said output fibers.

47. The apparatus of claim 5, further comprising one or more focusing elements, said focusing elements focusing one or more of said addressing electromagnetic radiation, said incident electromagnetic radiation, and said reflected electromagnetic radiation.

48. The apparatus of claim 5, wherein the reflectivity of said element at the wavelength of said addressing electromagnetic radiation has a first value when said phase change material is in a crystalline state and a second value when said phase change material is in an amorphous state, said second value differing from said first value.

49. The apparatus of claim 48, wherein the reflectivity of said element at the wavelength of said incident electromagnetic radiation has substantially the same value when said phase change material is in a crystalline state or an amorphous state.

50. A method for redirecting electromagnetic radiation comprising the steps of:

providing the stationary element of claim 1, said element having a first pattern of marks;

providing first incident electromagnetic radiation from a first incident direction to said element, said first incident electromagnetic radiation being reflected from said element in a first reflected direction determined by said first pattern of marks;

reconfiguring said element, said reconfiguring including providing energy to said element in an amount sufficient to alter said first pattern of marks to form a second pattern of marks;

providing second incident electromagnetic radiation from a second incident direction to said element, said second incident electromagnetic radiation being reflected from said element in a second reflected direction determined by said second pattern of marks.

51. The method of claim 50, wherein said first and second incident directions are the same direction.

52. The method of claim 50, wherein said first and second reflected directions are the same direction.

53. The method of claim 50, wherein said first and second incident electromagnetic radiation have the same wavelength.

* * * * *